(12) United States Patent
Zhang et al.

(10) Patent No.: US 12,141,981 B2
(45) Date of Patent: Nov. 12, 2024

(54) SYSTEM AND METHOD FOR PERFORMING SEMANTIC IMAGE SEGMENTATION

(71) Applicant: QUALCOMM Incorporated, San Diego, CA (US)

(72) Inventors: Shuai Zhang, San Diego, CA (US); Xiaowen Ying, Bethlehem, PA (US); Jiancheng Lyu, San Diego, CA (US); Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 17/669,040

(22) Filed: Feb. 10, 2022

(65) Prior Publication Data

US 2023/0306600 A1 Sep. 28, 2023

(51) Int. Cl.
*G06T 7/10* (2017.01)
*G06N 3/063* (2023.01)
*G06T 7/50* (2017.01)

(52) U.S. Cl.
CPC ............. *G06T 7/10* (2017.01); *G06N 3/063* (2013.01); *G06T 7/50* (2017.01); *G06T 2207/10024* (2013.01); *G06T 2207/20081* (2013.01)

(58) Field of Classification Search
CPC ... G06T 7/10; G06T 7/50; G06T 2207/10024; G06T 2207/20081; G06N 3/063
See application file for complete search history.

(56) References Cited

U.S. PATENT DOCUMENTS

| 2002/0103630 | A1* | 8/2002 | Aldred ................ E21B 44/00 703/10 |
| 2007/0035563 | A1* | 2/2007 | Biocca ............... G06F 3/0346 345/633 |
| 2007/0099290 | A1* | 5/2007 | Iida ................ B01L 3/502746 977/900 |
| 2015/0130644 | A1* | 5/2015 | Kiel .................... B64D 47/04 340/953 |
| 2017/0235848 | A1* | 8/2017 | Van Dusen .......... G06Q 10/101 705/12 |

(Continued)

FOREIGN PATENT DOCUMENTS

CN 113469094 A 10/2021

OTHER PUBLICATIONS

International Search Report and Written Opinion—PCT/US2022/080520—ISA/EPO—Mar. 14, 2023.

(Continued)

*Primary Examiner* — Qun Shen
(74) *Attorney, Agent, or Firm* — Polsinelli/Qualcomm

(57) ABSTRACT

Systems and techniques are provided for performing semantic image segmentation using a machine learning system (e.g., including one or more cross-attention transformer layers). For instance, a process can include generating one or more input image features for a frame of image data and generating one or more input depth features for a frame of depth data. One or more fused image features can be determined, at least in part, by fusing the one or more input depth features with the one or more input image features, using a first cross-attention transformer network. One or more segmentation masks can be generated for the frame of image data based on the one or more fused image features.

30 Claims, 10 Drawing Sheets

(56) References Cited

U.S. PATENT DOCUMENTS

| | | | | |
|---|---|---|---|---|
| 2017/0278668 | A1* | 9/2017 | Man | H01J 37/28 |
| 2021/0232850 | A1* | 7/2021 | Bui | G06V 20/20 |
| 2022/0147838 | A1* | 5/2022 | Gu | G06V 20/00 |
| 2022/0198813 | A1* | 6/2022 | Chiu | G06V 10/82 |
| 2022/0375187 | A1* | 11/2022 | Zhang | G06V 10/82 |

OTHER PUBLICATIONS

Liu K, "Depth Completion Network Guided by RGB Attention", 2021 IEEE 3rd International Conference on Frontiers Technology of Information and Computer (ICFTIC), IEEE, Nov. 12, 2021, pp. 217-222, XP034058512, DOI:10.1109/ICFTIC54370.2021. 9647068, Abstract Section III, Figures 1, 2.

Liu N., et al., "Visual Saliency Transformer", arxiv.org, Cornell University Library, 201 Olin Library Cornell University Ithaca, NY 14853, Apr. 25, 2021, 15 Pages, XP081943660, Section 3.1, 3.2, Figure 1.

Liu Z., et al., "Swin Transformer: Hierarchical Vision Transformer Using Shifted Windows", arxiv. org, Cornell University Library, 201 Olin Library Cornell University Ithaca, NY 14853, XP091024409, arXiv:2103.14030v2 [cs.CV], Aug. 17, 2021, 14 Pages, Abstract, Figures 2,3 Paragraphs [0001], [0003], Section 3, Figure 2.

Prakash A., et al., "Multi-Modal Fusion Transformer for End-to-End Autonomous Driving", arxiv.org, Cornell University Library, 201 Olin Library Cornell University Ithaca, NY 14853, Apr. 19, 2021, 11 Pages, XP081940533, Sections 3-3.3, Figure 2.

Wang X., et al., "MutualFormer: Multi-Modality Representation Learning via Mutual Transformer", Journal of Latex Class Files, vol. 14, No. 8, Dec. 31, 2021, pp. 1-12, XP093025077, Aug. 2015, DOI: 10.48550/arxiv.2112.01177, Abstract, Section 3, Figures 1-3.

Wang Z., et al., "Bimodal Information Fusion Network for Salient Object Detection based on Transformer", 2022 3rd International Conference on Pattern Recognition and Machine Learning (PRML), IEEE, Jul. 22, 2022, pp. 38-45, XP034185832, DOI: 10.1109/ PRML56267.2022.9882262, Section III, Figures 1, 2.

Wu Z., et al., "TC-Net: Transformer-Convolutional Networks for Road Segmentation", 2022 IEEE International Conference on Multimedia and Expo (ICME), IEEE, Jul. 18, 2022, 6 Pages, XP034176303, DOI: 10.1109/ICME52920.2022.9859734, Sections 1, 3.1, 3.2, Figures 2, 3.

Ying X., et al., "UCTNet: Uncertainty-Aware Cross-Modal Transformer Network for Indoor RGB-D Semantic Segmentation", Springer International Publishing, Jul. 22, 2022, pp. 20-37, XP047638897, Abstract Section 1, 3, 3.1, 3.3, 3.4, Figures 2, 4.

\* cited by examiner

SYSTEM AND METHOD FOR PERFORMING SEMANTIC IMAGE SEGMENTATION

FIELD

The present disclosure generally relates to image processing. For example, aspects of the present disclosure are related to systems and techniques for performing semantic image segmentation using a machine learning system (e.g., including one or more cross-attention transformer layers).

BACKGROUND

Many devices and systems allow a scene to be captured by generating images (or frames) and/or video data (including multiple frames) of the scene. For example, a camera or a device including a camera can capture a sequence of frames of a scene (e.g., a video of a scene). In some cases, the sequence of frames can be processed for performing one or more functions, can be output for display, can be output for processing and/or consumption by other devices, among other uses.

A common type of processing performed on a sequence of frames is image segmentation, which involves segmenting image and video frames into multiple portions. For example, image and video frames can be segmented into foreground and background portions. In some examples, semantic segmentation can segment image and video frames into one or more segmentation masks based on object classifications. For example, one or more pixels of the image and/or video frames can be segmented into classifications such as human, hair, skin, clothes, house, bicycle, bird, background, etc. The segmented image and video frames can then be used for various applications. Applications that use image segmentation are numerous, including, for example, computer vision systems, image augmentation and/or enhancement, image background replacement, extended reality (XR) systems, augmented reality (AR) systems, image segmentation, autonomous vehicle operation, among other applications.

BRIEF SUMMARY

In some examples, systems and techniques are described for performing semantic segmentation of one or more image frames and/or video frames using a transformer-based neural network architecture. According to at least one illustrative example, a method is provided for processing image data, the method including: generating one or more input image features for a frame of image data: generating one or more input depth features for a frame of depth data: determining one or more fused image features at least in part by fusing, using a first cross-attention transformer network, the one or more input depth features with the one or more input image features; and generating one or more segmentation masks for the frame of image data based on the one or more fused image features.

In another example, an apparatus for processing image data is provided that includes a memory (e.g., configured to store data, such as virtual content data, one or more images, etc.) and one or more processors (e.g., implemented in circuitry) coupled to the memory. The one or more processors are configured to and can: generate one or more input image features for a frame of image data: generate one or more input depth features for a frame of depth data; determine one or more fused image features at least in part by fusing, using a first cross-attention transformer network, the one or more input depth features with the one or more input image features; and generate one or more segmentation masks for the frame of image data based on the one or more fused image features.

In another example, a non-transitory computer-readable medium is provided that has stored thereon instructions that, when executed by one or more processors, cause the one or more processors to: generate one or more input image features for a frame of image data; generate one or more input depth features for a frame of depth data: determine one or more fused image features at least in part by fusing, using a first cross-attention transformer network, the one or more input depth features with the one or more input image features; and generate one or more segmentation masks for the frame of image data based on the one or more fused image features.

In another example, an apparatus for processing image data is provided. The apparatus includes: means for generating one or more input image features for a frame of image data: means for generating one or more input depth features for a frame of depth data: means for determining one or more fused image features at least in part by fusing, using a first cross-attention transformer network, the one or more input depth features with the one or more input image features; and means for generating one or more segmentation masks for the frame of image data based on the one or more fused image features.

In some aspects, one or more of the apparatuses described above is or is part of a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, an apparatus includes a camera or multiple cameras for capturing one or more images. In some aspects, the apparatus further includes a display for displaying one or more images, notifications, and/or other displayable data. In some aspects, the apparatus can include one or more sensors, which can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures.

DETAILED DESCRIPTION

Figure 1:
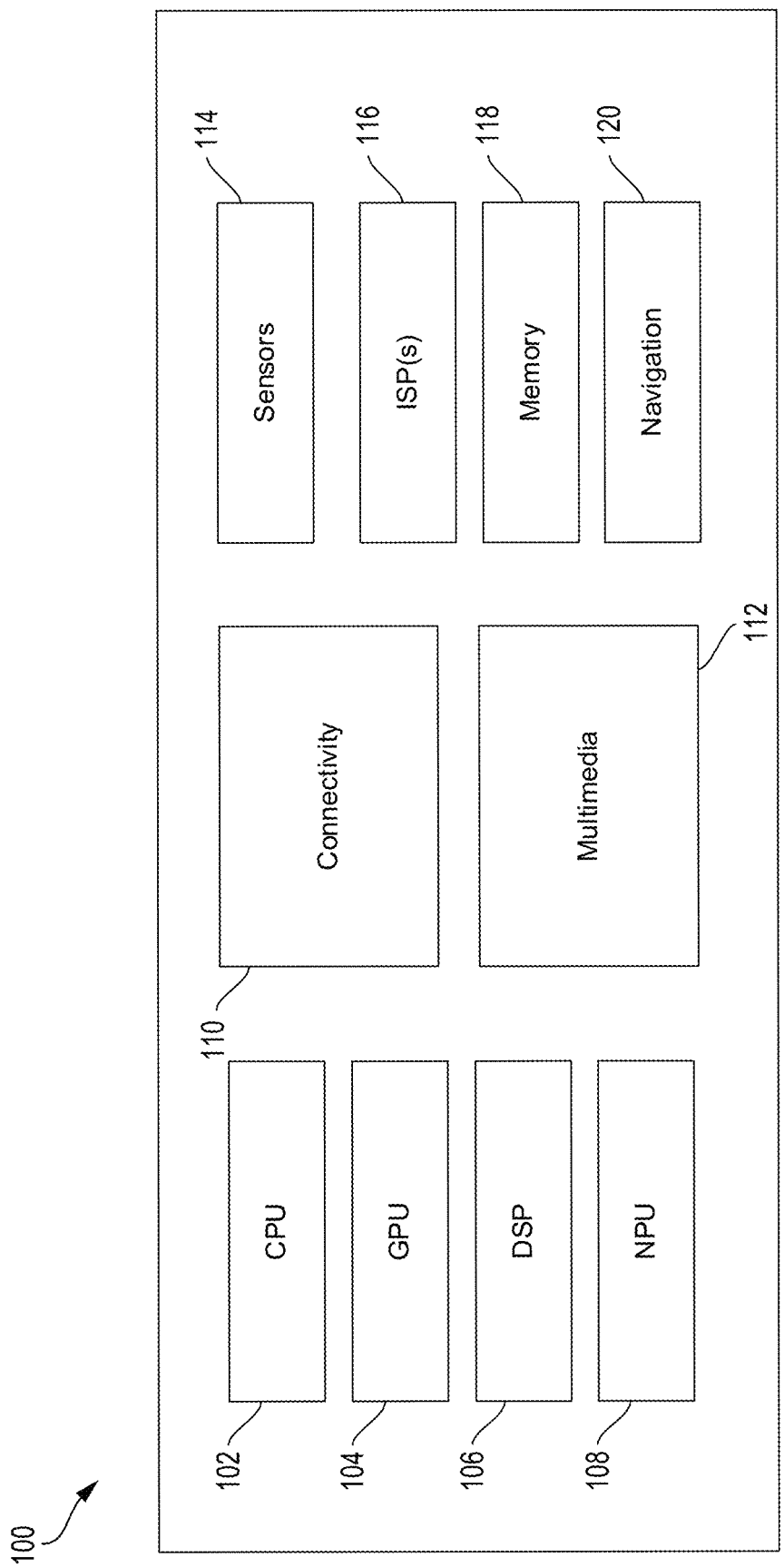
FIG. 1 illustrates an example implementation of a system-on-a-chip (SoC), in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes May be made in the function and arrangement of elements without departing from the spirit and scope of the application as set forth in the appended claims Image semantic segmentation is a task of generating segmentation results for a frame of image data, such as a still image or photograph. Video semantic segmentation is a type of image segmentation that includes a task of generating segmentation results for one or more frames of a video (e.g., segmentation results can be generated for all or a portion of the image frames of a video). Image semantic segmentation and video semantic segmentation can be collectively referred to as "image segmentation" or "image semantic segmentation." Segmentation results can include one or more segmentation masks generated to indicate one or more locations, areas, and/or pixels within a frame of image data that belong to a given semantic segment (e.g., a particular object, class of objects, etc.). For example, as explained further below; each pixel of a segmentation mask can include a value indicating a particular semantic segment (e.g., a particular object, class of objects, etc.) to which each pixel belongs.

In some examples, features can be extracted from an image frame and used to generate one or more segmentation masks for the image frame based on the extracted features. In some cases, machine learning can be used to generate segmentation masks based on the extracted features. For example, a convolutional neural network (CNN) can be trained to perform semantic image segmentation by inputting into the CNN many training images and providing a known output (or label) for each training image. The known output for each training image can include a ground-truth segmentation mask corresponding to a given training image.

In some cases, image segmentation can be performed to segment image frames into segmentation masks based on an object classification scheme (e.g., the pixels of a given semantic segment all belong to the same classification or class). For example, one or more pixels of an image frame can be segmented into classifications such as human, hair, skin, clothes, house, bicycle, bird, background, etc. In some examples, a segmentation mask can include a first value for pixels that belong to a first classification, a second value for pixels that belong to a second classification, etc. A segmentation mask can also include one or more classifications for a given pixel. For example, a "human" classification can have sub-classifications such as 'hair,' 'face,' or 'skin,' such that a group of pixels can be included in a first semantic segment with a 'face' classification and can also be included in a second semantic segment with a 'human' classification.

Segmentation masks can be used to apply one or more processing operations to a frame of image data. For instance, a system may perform image augmentation and/or image enhancement for a frame of image data based on a semantic segmentation mask generated for the frame of image data. In one example, the system may process certain portions of a frame with a particular effect, but may not apply the effect to a portion of the frame corresponding to a particular class indicated by a segmentation mask for the frame. Image augmentation and enhancement processes can include, but are not limited to, personal beautification, such as skin smoothing or blemish removal: background replacement or blurring: providing an extended reality (XR) or augmented reality (AR) experience: etc. Semantic segmentation masks can also be used to manipulate certain objects or segments in a frame of image data, for example by using the semantic segmentation mask to identify the pixels in the image frame that are associated with the object or portions to be manipulated. In one example, background objects in a frame can be artificially blurred to visually separate them from an in-focus or foreground object of interest (e.g., a person's face) identified by a segmentation mask for the frame (e.g., an artificial bokeh effect can be generated and applied based on the segmentation mask), where the object of interest is not blurred. In some cases, visual effects can be added to a frame of image data using the segmentation information.

The accuracy and quality of subsequent image processing operations that use semantic segmentation masks can often depend on the underlying accuracy and quality of the semantic segmentation mask. In one illustrative example, an image enhancement process can use a semantic segmentation mask to identify the pixels of an image frame that represent a human face and can subsequently apply facial beautification and skin smoothing operations to the identified pixels. However, if the semantic segmentation mask does not accurately identify the pixels representing a human face, then the facial beautification and skin smoothing operations can yield low quality or visually unappealing results (e.g., if the semantic segmentation mask is over-inclusive or under-inclusive relative to the actual or ground truth pixels that represent the face in the image frame).

Systems and techniques are needed for more accurately generating semantic image segmentation masks. While some machine learning (ML) and neural network-based approaches have investigated generating segmentation masks based on features extracted from image data and features extracted from depth data, these approaches are often limited by their use of convolutional neural network (CNN) encoders to generate image and depth features. The CNN encoders used in these approaches extract features only from a fixed local window, which is smaller than a global window of the entire image/depth frame, and the extracted features may not reflect global relationships in the underlying image and depth data. Another technique includes using channel-wise attention to pass feature information from a convolutional depth encoder to a convolutional image encoder. However, according to such techniques, the information transfer is unidirectional, only passing depth features to the convolutional image encoder.

Systems, apparatuses, processes (also referred to as methods), and computer-readable media (collectively referred to as "systems and techniques") are described herein for performing semantic segmentation of one or more frames of image data and/or video data. As noted above, semantic segmentation can include generating one or more segmentation masks for a frame of image data. In some examples, the systems and techniques described herein can use a dual-encoding cross-attention network to perform semantic image segmentation. In some aspects, the dual-encoding cross-attention network can be a neural network that includes one or more shifted window transformer layers (e.g., a cross-attention transformer network) for determining cross-attention between an image encoder and a depth encoder.

A transformer is a type of deep learning model that utilizes an attention mechanism to differentially weight the significance of each part of the input data and model long-range dependencies. While transformers are often used to handle sequential input data, a transformer does not necessarily process the data in the same sequential order in which the data was originally received or arranged. Moreover, because transformers can use attention to determine contextual relationships between sub-portions of the input data, a transformer can process some or all of the sub-portions in parallel, such as when computing attention, self-attention, and/or cross-attention. This parallelization can provide greater computational flexibility in comparison to, for example, recurrent neural networks (RNNs), CNNs, or other neural networks trained to perform the same task.

In some aspects, a transformer-based semantic image segmentation described herein can include a first encoder and a second encoder. For example, the first encoder can be an image transformer encoder and the second encoder can be a depth transformer encoder. In some examples, the image transformer encoder can include a plurality of sequentially arranged image transformer layers and/or the depth transformer encoder can include a plurality of sequentially arranged depth transformer layers. In some examples, one or more of the image transformer layers and/or the depth transformer layers can be provided as shifted window transformers capable of computing attention globally rather than in local windows. In some cases, shifted window transformer blocks included in the image transformer encoder can generate image features based on determining self-attention globally across an entire input frame of image data. In some cases, shifted window transformer blocks included in the depth transformer encoder can generate depth features based on determining self-attention globally across an entire input frame of depth data (e.g., a depth map).

In some examples, the image transformer encoder is symmetric to the depth transformer encoder, with separate sets of training data used to train each encoder. For example, a given underlying transformer encoder architecture can be trained on training data pairs that include a frame of image data and a corresponding ground truth semantic segmentation mask for the frame of image data, to thereby obtain a trained image transformer encoder. The same given underlying transformer encoder architecture can also be trained on training data pairs that include a frame of depth data and a corresponding ground truth depth map for the frame of depth data, to thereby obtain a trained depth transformer encoder.

In some aspects, one or more cross-attention fusion transformer blocks can be provided between transformer layers of the image encoder and transformer layers of the depth encoder. In some examples, the cross-attention fusion transformer blocks can be provided as shifted window transformers. The shifted window transformers of the cross-attention fusion blocks can be the same as or similar to the shifted window transformers of the image encoder and/or the depth encoder. In one illustrative example, the shifted window transformers of the image encoder and/or the depth encoder can generate image features and depth features, respectively, based on calculating self-attention. The shifted window transformers of the cross-attention fusion transformer blocks can generate fused image-depth features (e.g., depth features fused into image features) and fused depth-image features (e.g., image features fused into depth features) based on calculating one or more sets of cross-attention features between image features and depth features that are provided as inputs to the cross-attention fusion transformer block.

In some examples, one or more bidirectional cross-attention fusion transformer blocks can be arranged sequentially with a unidirectional cross-attention fusion transformer block provided at a terminal end of the sequence. Bidirectional cross-attention fusion transformer blocks can be used to generate both fused image-depth features and fused depth-image features. For example, an image fusion branch can use input image features and input depth features received at the bidirectional cross-attention fusion transformer block to generate the fused image-depth features: a depth fusion branch can use the same input image features and the same input depth features to generate the fused depth-image features. The unidirectional cross-attention fusion transformer block can use input image features and input depth features to generate a final output of fused image-depth features that is then provided as input to a trained segmentation encoder. The trained segmentation encoder can use the final output of fused image-depth features to generate one or more segmentation masks for an input frame of image data, with a higher degree of accuracy and a greater efficiency over existing semantic image segmentation techniques that do not utilize transformer-based encoders and/or bidirectional fusion and exchange of information between the image and depth modalities.

Various aspects of the present disclosure will be described with respect to the figures. FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform image processing using machine learning techniques according to aspects of the present disclosure discussed herein. For example, SOC 100 and/or components thereof may be configured to perform semantic image segmentation according to aspects of the present disclosure. In some cases, by using neural network architectures such as transformers and/or shifted window transformers in determining one or more segmentation masks, aspects of the present disclosure can increase the accuracy and efficiency of semantic image segmentation.

In general, ML can be considered a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multi-layer perceptron (MLP) neural networks, transformer neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
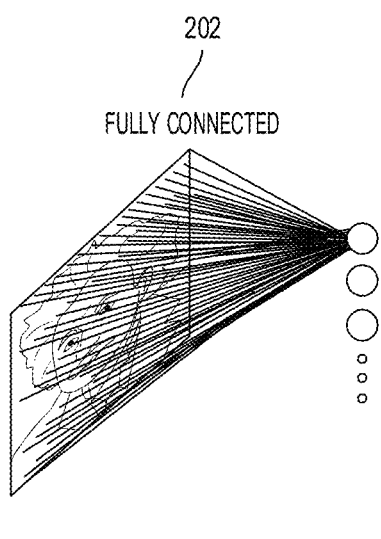
FIG. 2A illustrates an example of a fully connected neural network, in accordance with some examples.
Figure 2B:
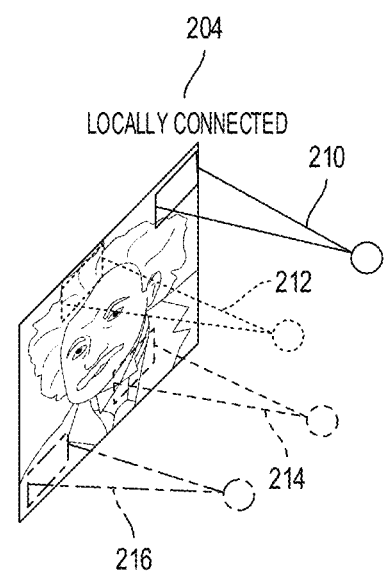
FIG. 2B illustrates an example of a locally connected neural network, in accordance with some examples.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, as the higher layer neurons in a given region may receive inputs that are tuned through training to the properties of a restricted portion of the total input to the network.

Figure 3:
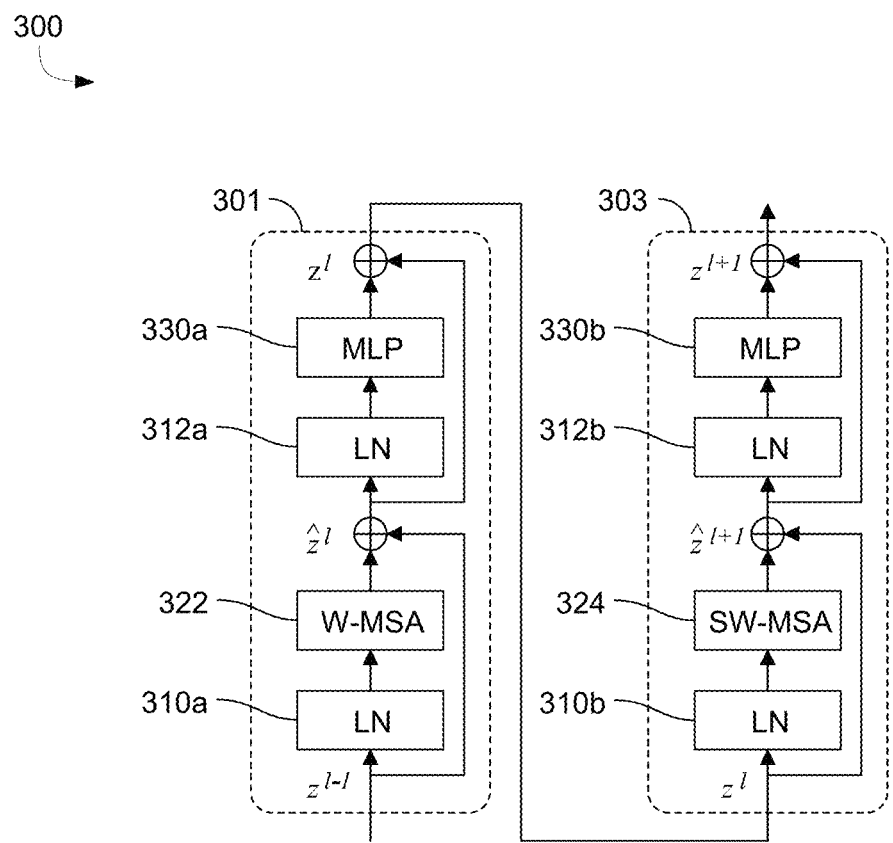
FIG. 3 is a diagram illustrating an example architecture of a pair of shifted window transformer blocks, in accordance with some examples of the present disclosure.

FIG. 3 depicts an example architecture 300 of a first shifted window transformer block 301 and a second shifted window transformer block 303, collectively referred to as a transformer block pair. As illustrated, the first shifted window transformer block 301 includes a layer norm 310a; a self-attention component 322 (also referred to as a "self-attention layer" or "first self-attention layer"); a layer norm 312a; and a feed-forward neural network component 330a, depicted as a multi-layer perceptron (MLP). The second shifted window transformer block 303 includes a layer norm 310b; a self-attention component 324 (also referred to as a "self-attention layer" or "second self-attention layer"): a layer norm 312b; and a feed-forward neural network component 330b, depicted again as an MLP.

In some examples, the first shifted window transformer block 301 can be the same as the second shifted window transformer block 303, with the exception of their respective self-attention layers 322 and 324, which apply different window partitioning configurations. In some cases, first self-attention layer 322 can comprise windowed multi-head self-attention (W-MSA) and second self-attention layer 324 can comprise shifted window multi-head self-attention (SW-MSA).

In some examples, the first self-attention layer 322 of the first shifted window transformer block 301 can use a shift window with shift size=0 (corresponding to no shift). For example, when the window size is 8, the first attention layer (e.g., first self-attention layer 322) can use a shift size=0, the second attention layer (that follows the first attention layer, such as second self-attention layer 324) can use a shift size=4, the third attention layer (that follows the second attention layer) can use shift size=0 again, the fourth attention layer (that follows the third attention layer) can use a shift size=4, and so on for the number of shifted window transformer blocks in a given transformer block set. Alternating shift size values (e.g., alternating shift=0 and shift=4) results in the effect of propagating signals across windows. In some cases, it is not necessary to have shift=4 after shift=0, as the shift size can be variable.

In some examples, first self-attention layer 322 can apply a non-overlapping window partitioning configuration (such as configuration 420 of FIG. 4B) to divide a set of patches into non-overlapping windows that each contain multiple patches. The first self-attention layer 322 can then compute self-attention locally within each window. The first self-attention layer 322 can provide the self-attention information to the layer norm 312a layer (e.g., a Softmax layer). For example, the first self-attention layer 322 can compute self-attention values by computing a matrix of outputs as:

$$\text{Attention}(Q, K, V) = \text{softmax}\left(\frac{QK^T}{\sqrt{d_k}}\right)V$$

where the matrix $Q=W_q \cdot X$, the matrix $K=W_k \cdot X$, and the matrix $V=W_v \cdot X$, and where the inputs to Q, K, V are the same X (and thus the computation of "self" attention). The $W_q$, $W_k$, and $W_v$ terms are linear layers that project or map the input vector X to the query (Q), key (K), and value (V) matrices. The term $d_k$ refers to a dimension of a key k, with $\sqrt{d_k}$ acting as a scaling factor. Softmax refers to a softmax function that is used obtain weights on the self-attention values. The layer norm 312a can output the weights to the feedforward neural network component 330a (e.g., a multi-layer perceptron (MLP) layer). The output of first shifted window transformer block 301 can then be provided as input to second shifted window transformer block 303.

In the second self-attention layer 324, the window partitioning is shifted, resulting in new windows that overlap those of the first self-attention layer 322. For example, a shifted window partitioning configuration (such as configuration 430 of FIG. 4B) can be applied by second self-attention layer 324. The self-attention computation in the shifted windows of second self-attention layer 324 crosses the boundaries of the previous windows in first self-attention layer 322, resulting in cross-window connections that can be provided to the layer norm 312b. The layer norm 312b can provide an output to feedforward neural network component 330b.

Figure 4A:
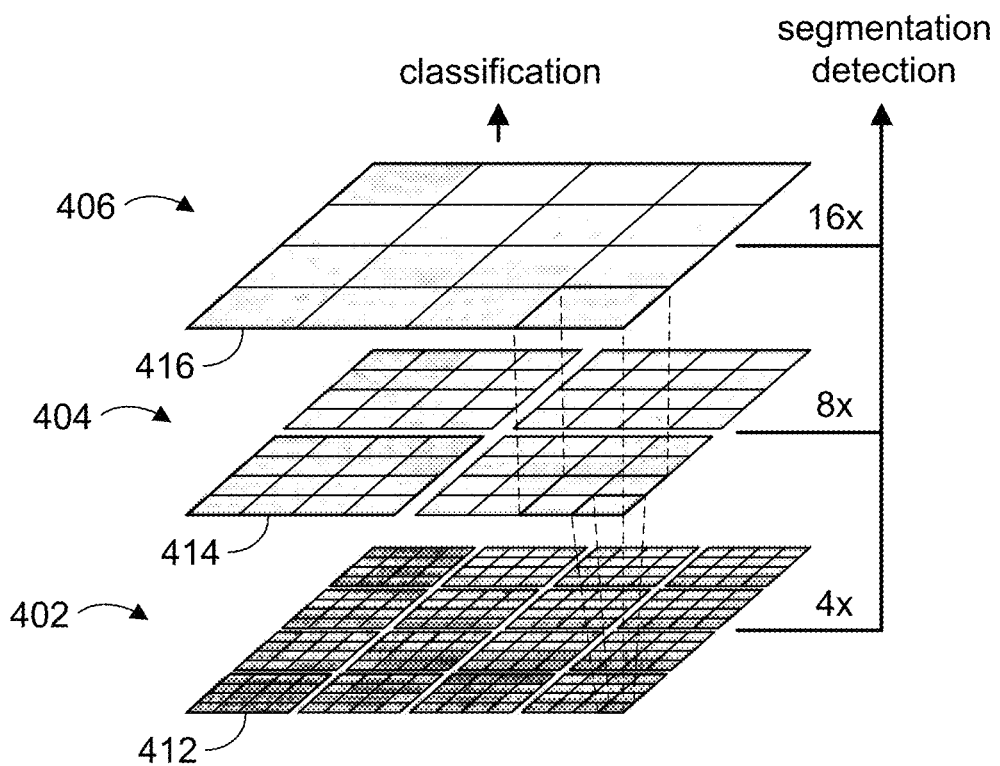
FIG. 4A is a diagram illustrating an example of a window partitioning or window reverse partitioning process that can be applied between one or more shifted window transformer layers of a neural network-based encoder for image segmentation, in accordance with some examples of the present disclosure.
Figure 4B:
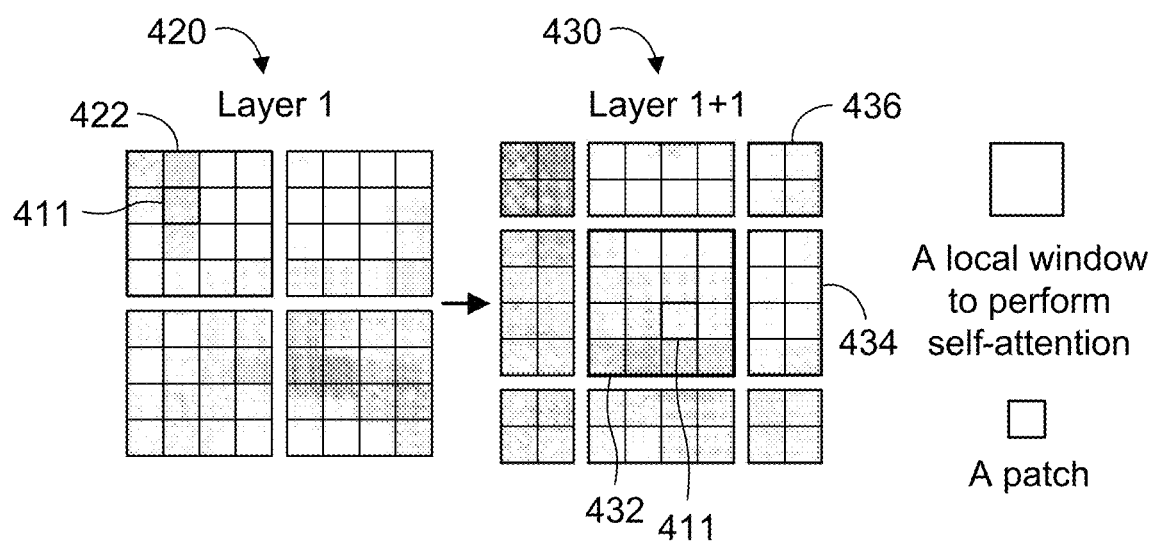
FIG. 4B is a diagram illustrating an example of a shifted window self-attention calculation that can be applied by one or more shifted window transformer layers of a neural network-based encoder for image segmentation, in accordance with some examples of the present disclosure.

FIG. 4A is a diagram illustrating an example of a technique of merging image patches in deeper encoder transformer layers (e.g., bottom to top), as will be described in greater detail below: FIG. 4B illustrates an example of two different window partitioning configurations, including window partitioning configuration 420 and window partitioning configuration 430. Window partitioning configuration 420 depicts a non-overlapping window partitioning applied over a set of patch tokens, and in some examples may be utilized by the first self-attention layer 322 of FIG. 3. An example of a non-overlapping window partition 422 and an example of a patch token 411 of its constituent patch tokens is shown in FIG. 4B. In some examples, the first shifted window transformer block 301 of FIG. 3 can apply the non-overlapping window partitioning configuration 420 using self-attention component 322.

Window partitioning configuration 430 depicts a shifted window partitioning applied over a set of patch tokens, and in some examples may be utilized by the second self-attention layer 324 of FIG. 3. In some cases, the two window partitioning configurations 420 and 430 can be applied over the same set of patch tokens.

In some examples, the non-overlapping window partitioning configuration 420 divides the set of input patch tokens into equally sized windows, shown here as 4×4 windows containing 16 patch tokens, although other window geometries and/or sizes can also be utilized. For example, in some embodiments a window size of 7×7 can be utilized, as will be discussed in the context of the example(s) of one or more of FIGS. 5-8.

The shifted window partitioning configuration 430 can utilize windows that are displaced relative to those of the non-overlapping partitioning configuration 420. For example, shifted windows 432 and 434 have been displaced such that they each contain a set of tokens that were previously contained in multiple different ones of the non-overlapping windows of partitioning configuration 420. Shifted window 436 has been displaced such that it spans beyond a boundary of the non-overlapping window at the upper right of non-overlapping partitioning configuration 420 and contains only a portion of the tokens from the associated non-overlapping window. Because a single shifted window contains patch tokens from multiple non-overlapping windows of the previous self-attention layer, the previously mentioned cross-window connections can thereby be introduced. As illustrated, the shifted window partitioning configuration 430 can use the same 4×4 window size as the non-overlapping window partitioning configuration, with clipping or truncation of the window size where it extends beyond the boundaries of the patch token set. However, in some examples the shifted window portioning configuration 430 and the non-overlapping window partitioning configuration 420 can use different window sizes (e.g., include 7×7, as mentioned above).

In the example of FIG. 4A, image patches are depicted as being merged in deeper encoder transformer layers (e.g., bottom to top). At a first layer 402, image data is represented as having been partitioned into a 16×16 grid of patches, where each patch contains a number of discrete pixels from an original frame of image data. As illustrated, the image patches can be partitioned into a plurality of non-overlapping 4×4 windows, such as the first window 412 containing 16 total patches. Patch merging can be applied between first layer 402 and a second layer 404, and between second layer 404 and a third layer 406.

Between first layer 402 and second layer 404, patch merging can be performed by concatenating features from 2×2 groups of neighboring windows of first layer 402 into a single merged window 414 of second layer 404 (e.g., window 412 and its three neighboring windows can be combined to form merged window 414). In some examples, patch merging can include applying a linear layer on the concatenated features of merged window 414. As such, the single merged window 414 of second layer 404 can include concatenated features from four separate windows in first layer 402 (e.g., such as the window 412 of first layer 402). Additionally, the single merged window 414 of second layer 404 can be partitioned into a 4×4 grid of merged patches, where each merged patch of second layer 404 can contain concatenated features from four separate patches in first layer 402. As illustrated in FIG. 4A, between first layer 402 and second layer 404, the total number of patches has been reduced by a factor of four, resolution has been downsampled by a factor of two, and a spatial dimension of the patch merging process has increased from C to 2C.

Between second layer 404 and a third layer 406, an identical patch merging process can be applied to concatenate features from the 2×2 group of windows including merged window 414 and its three neighboring windows into a single merged window 416 of third layer 406. In some examples, the merged window 416 of third layer 406 can include concatenated features from four separate windows of second layer 402 (e.g., from merged window 414 and its three neighboring windows in second layer 402). Additionally, the merged window 416 of third layer 406 can be partitioned into a 4×4 grid of merged patches, where each merged patch of third layer 406 can contain concatenated features from four separate patches of second layer 404 (e.g., which can be the same as containing concatenated features from 16 separate patches of first layer 402). As was the case between first layer 402 and second layer 404, the patch merging process between second layer 404 and third layer 406 can reduce the total number of patches by a factor of four and downsamples resolution by a factor of two. An output or spatial dimension of the patch merging process between second layer 404 and third layer 406 can increased to 4C.

Figure 5:
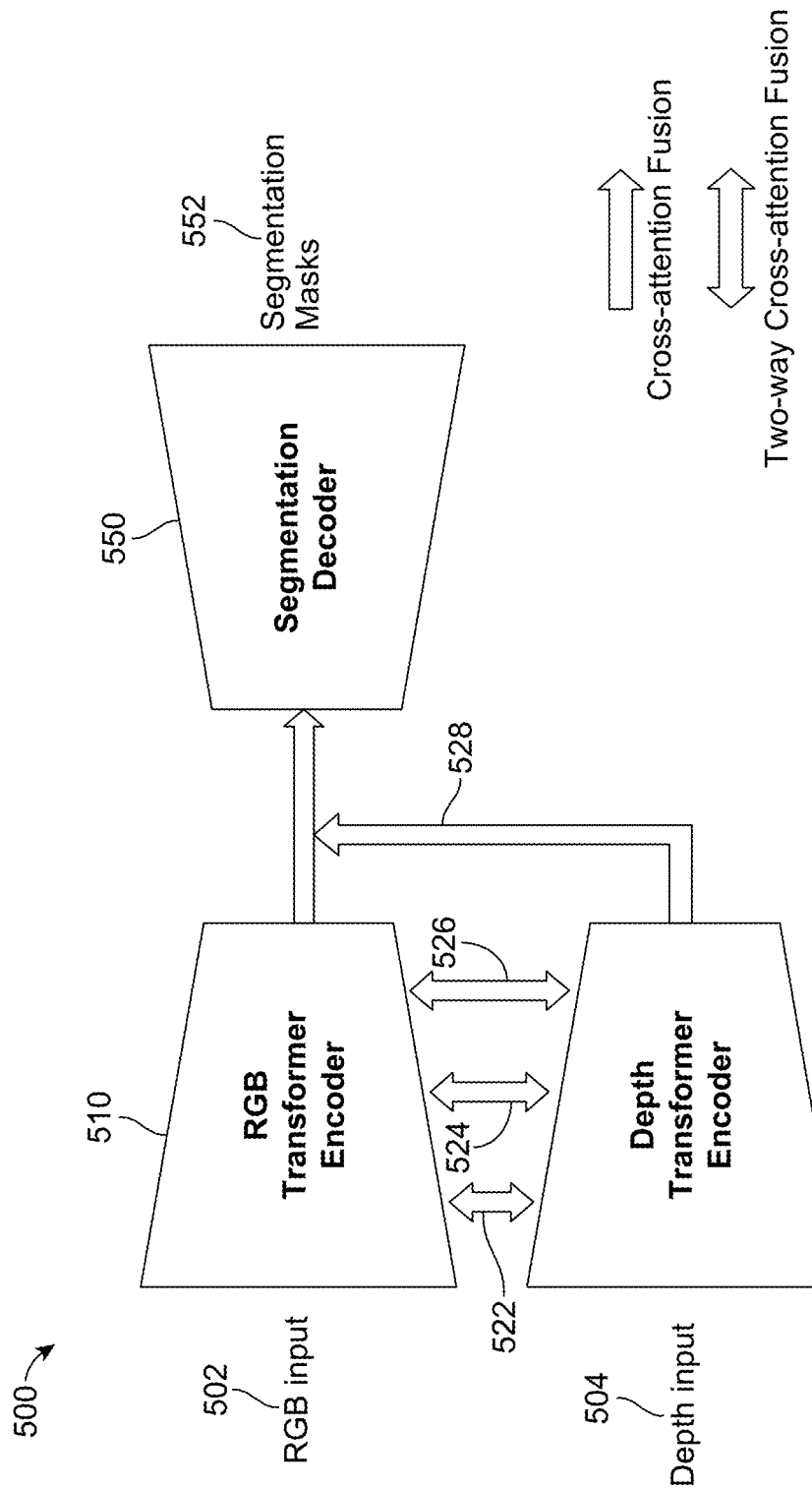
FIG. 5 is a diagram illustrating an example of a dual-encoding cross-attention network for multi-class image segmentation, in accordance with some examples of the present disclosure.

FIG. 5 is a diagram illustrating an example of a dual-encoding cross-attention network 500 for multi-class image segmentation, in accordance with some examples of the present disclosure. As a dual encoding network, network 500 includes a first encoder (shown here as an image transformer encoder 510) and a second encoder (shown here as a depth transformer encoder 530). In one illustrative example, the dual-encoding cross-attention network 500 can be a cross-attention transformer network. As a cross-attention network, network 500 includes one or more cross-attention fusion blocks 522, 524, 526, and 528 for determining cross-attention between the image encoder 510 and the depth encoder 530.

In some examples, image encoder 510 and depth encoder 530 can have a same or similar architecture but be trained on different sets of training data (e.g., a given transformer encoder architecture can be trained on image data to obtain image encoder 510 and the same given transformer encoder architecture can be trained on depth data to obtain depth encoder 530). As will be explained in greater depth with respect to FIG. 6, the image encoder 510 can include one or more transformer layers for generating image features based on received image input and the depth encoder 530 can include one or more transformer layers for generating depth features based on received depth inputs. For example, a first transformer layer of image encoder 510 can receive a color (e.g., RGB) image input 502 and generate one or more image features and/or image feature maps based on RGB image input 502. Similarly, a first transformer layer of depth encoder 530 can receive a depth input 504 and generate one or more depth features and/or depth feature maps based on depth input 504. In one illustrative example, image encoder 510 and/or depth encoder 530 can include one or more shifted window transformers (e.g., based on the shifted window transformer architecture above previously with respect to FIGS. 3-4B).

The image input 502 can be a frame of image data including a plurality of pixels each having an RGB (Red Green Blue) color value, although it is noted that various other color models can be utilized without departing from the scope of the present disclosure. For example, the image input 502 can be a frame of image data that includes color image data such as RGB image data. In some examples, image input 502 can be a still image captured by a camera, including a smartphone camera. In some cases, image input 502 can be an image frame obtained from a video data (e.g., video data comprising a series of sequentially arranged image frames).

The depth input 504 can be a depth map or other representation of a plurality of depth values corresponding to one or more pixels of the image input 502. Depth input 504 and image input 502 can be obtained from the same device and/or can be obtained from different devices. In some examples, depth input 504 and image input 502 can be obtained at a same or similar point in time, such that depth input 504 and image input 502 represent a same (or similar) view of a scene or environment. In one illustrative example, the depth input 504 can be captured by the same camera or device as used to capture the image input 502. For example, image input 502 can be RGB image data captured by a camera sensor of a smartphone or mobile computing device and depth input 504 can be a depth map captured by a depth sensor of the same smartphone or mobile computing device. Depth sensors can include, but are not limited to, Time of Flight (ToF) sensors and Light Detection and Ranging (LIDAR) sensors. In some examples, depth input 504 can be determined computationally, for example using one or more computer vision techniques, stereo depth cameras, etc.

In some cases, depth input 504 and image input 502 can have the same or similar pixel dimensions and/or resolution. For example, both the depth input 504 and the image input 502 could have dimensions of 1,000 px×1,000 px. In some cases, one (or both) of depth input 504 and image input 502 can be pre-processed such that the two inputs have same or similar dimensions, resolution, etc. Pre-processing can include one or more operations such as cropping, upscaling, downscaling, etc.

Figure 7:
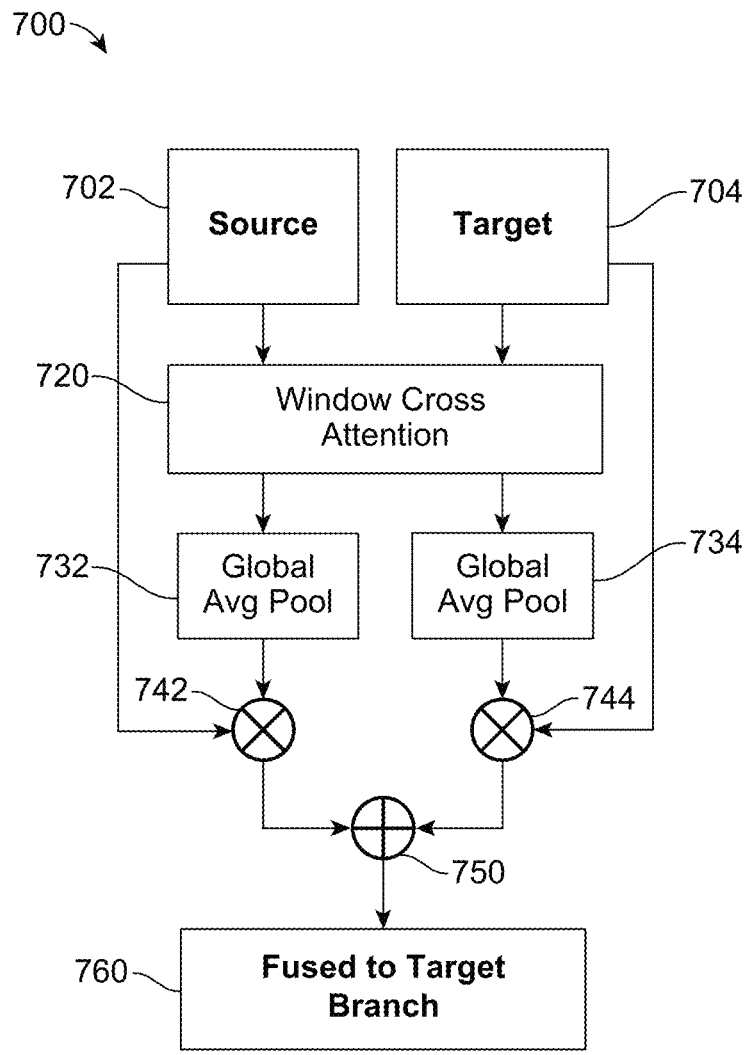
FIG. 7 is a diagram illustrating an example architecture for windowed cross-attention fusion, in accordance with some examples of the present disclosure.
Figure 8:
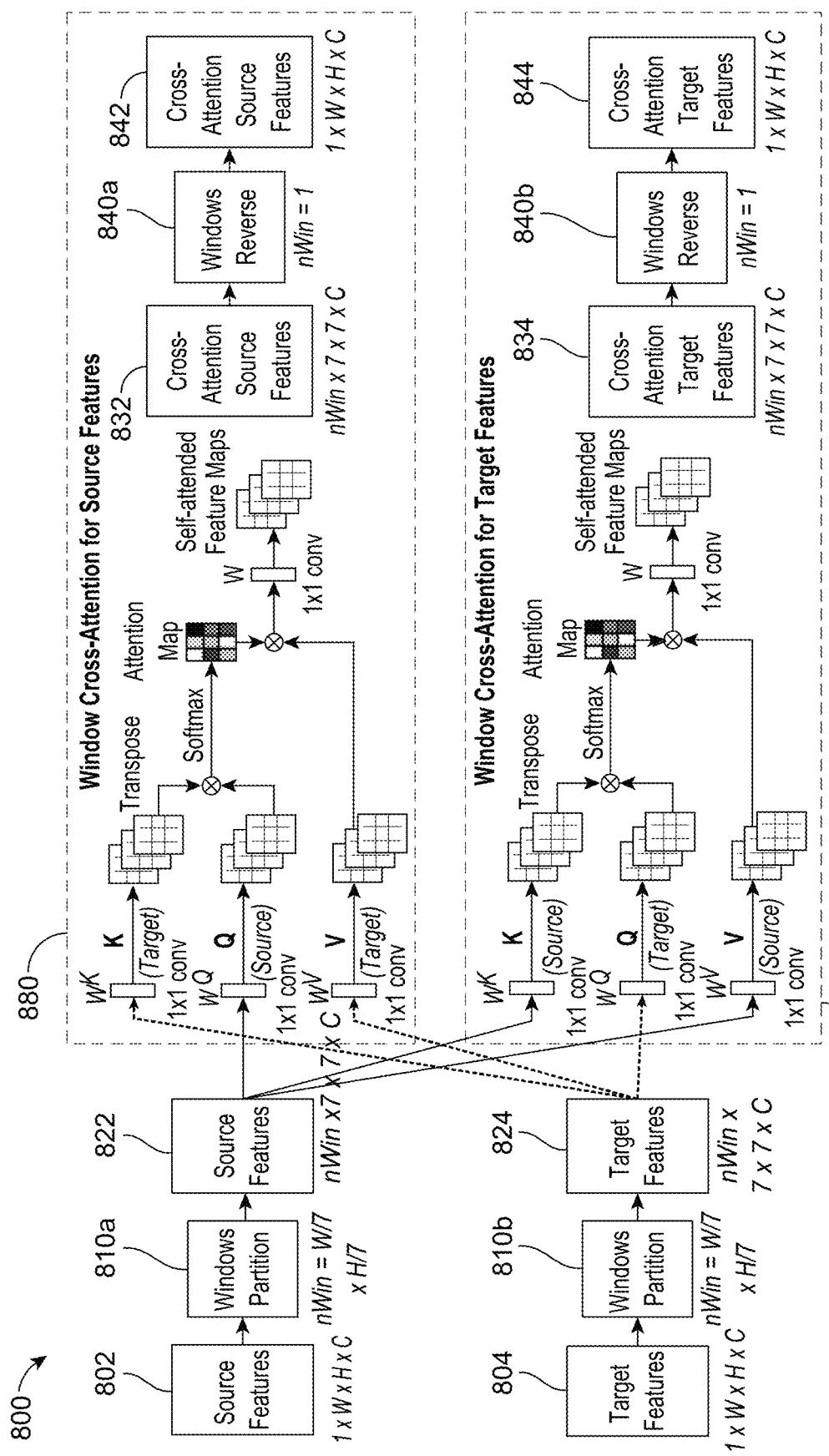
FIG. 8 is a diagram illustrating an example architecture of a transformer-based cross-attention neural network having a first cross-attention branch for image features and a second cross-attention branch for depth features, in accordance with some examples of the present disclosure.

As illustrated in FIG. 5, the cross-attention fusion blocks 522, 524, 526, and 528 can be provided between image encoder 510 and depth encoder 530. The cross-attention fusion blocks can receive as input the generated features that are output by one or more of the transformer layers of image encoder 510 and depth encoder 530. As will be explained in greater depth below; the cross-attention fusion blocks 522, 524, 526, and 528 can generate fused image features and/or fused depth features based on cross-attention determined between the input image features and the input depth features. It is noted that FIGS. 7 and 8 depict examples of a cross-attention fusion architecture that can be used by some or all of the cross-attention fusion blocks 522, 524, 526, and 528, as will be explained in greater depth below with respect to FIGS. 7 and 8.

In one illustrative example, the fused image features output by the cross-attention fusion blocks can be provided as input to one or more transformer layers of image encoder 510, such that a transformer layer of image encoder 510 can receive fused image features from a first cross-attention fusion block, generate image features based on the fused image features, and output the generated image features to a second cross-attention fusion block. Similarly, a transformer layer of depth encoder 530 can receive fused depth features from the same first cross-attention fusion block, generate depth features based on the fused depth features, and output the generate depth features to the same second cross-attention fusion block.

As illustrated, the three cross-attention fusion blocks 522, 524, and 526 can be provided as bidirectional cross-attention fusion blocks and the cross-attention fusion block 528 can be provided as a unidirectional cross-attention fusion block. However, it is noted that a greater or lesser number of bidirectional cross-attention fusion blocks and/or a greater or lesser number of unidirectional cross-attention fusion blocks can be utilized without departing from the scope of the present disclosure. In some examples, both the bidirectional cross-attention fusion blocks 522, 524, 526 and the unidirectional cross-attention fusion block 528 can receive inputs of image features (e.g., from a transformer layer of image encoder 510) and inputs of depth features (e.g., from a transformer layer of depth encoder 530).

The bidirectional cross-attention fusion blocks 522, 524, and 526 can perform two cross-attention fusion operations. For example, a first cross-attention fusion operation can generate fused image features by fusing the input depth features to the input image features (e.g., with the input image features set as the cross-attention target and the input depth features set as the cross-attention source). A second cross-attention fusion operation can generate fused depth features by fusing the input image features to the input depth features (e.g., with the input depth features set as the cross-attention target and the input image features set as the cross-attention source).

In some examples, a unidirectional cross-attention fusion operation includes one of the two cross-attention fusion operations described above. For example, as illustrated in FIG. 5, the unidirectional cross-attention fusion block 528 can receive image features from a final transformer layer of image encoder 510 and depth features from a final transformer layer of depth encoder 530. Unidirectional cross-attention fusion block 528 can subsequently generate a final fused output by fusing the depth features into the image features (e.g., with the received image features as the cross-attention target and the received depth features as the cross-attention source). The final fused output generated by unidirectional cross-attention fusion block 528 can include fused image-depth features that combine information from the RGB image data input 502 and the depth data input 504. As illustrated, the final fused output from unidirectional cross-attention block 528 can be provided to a segmentation decoder 550) as input. The segmentation decoder 550 can then generate one or more segmentation masks 552 for the RGB image input 502 based on the final output of fused image-depth features.

Figure 6:
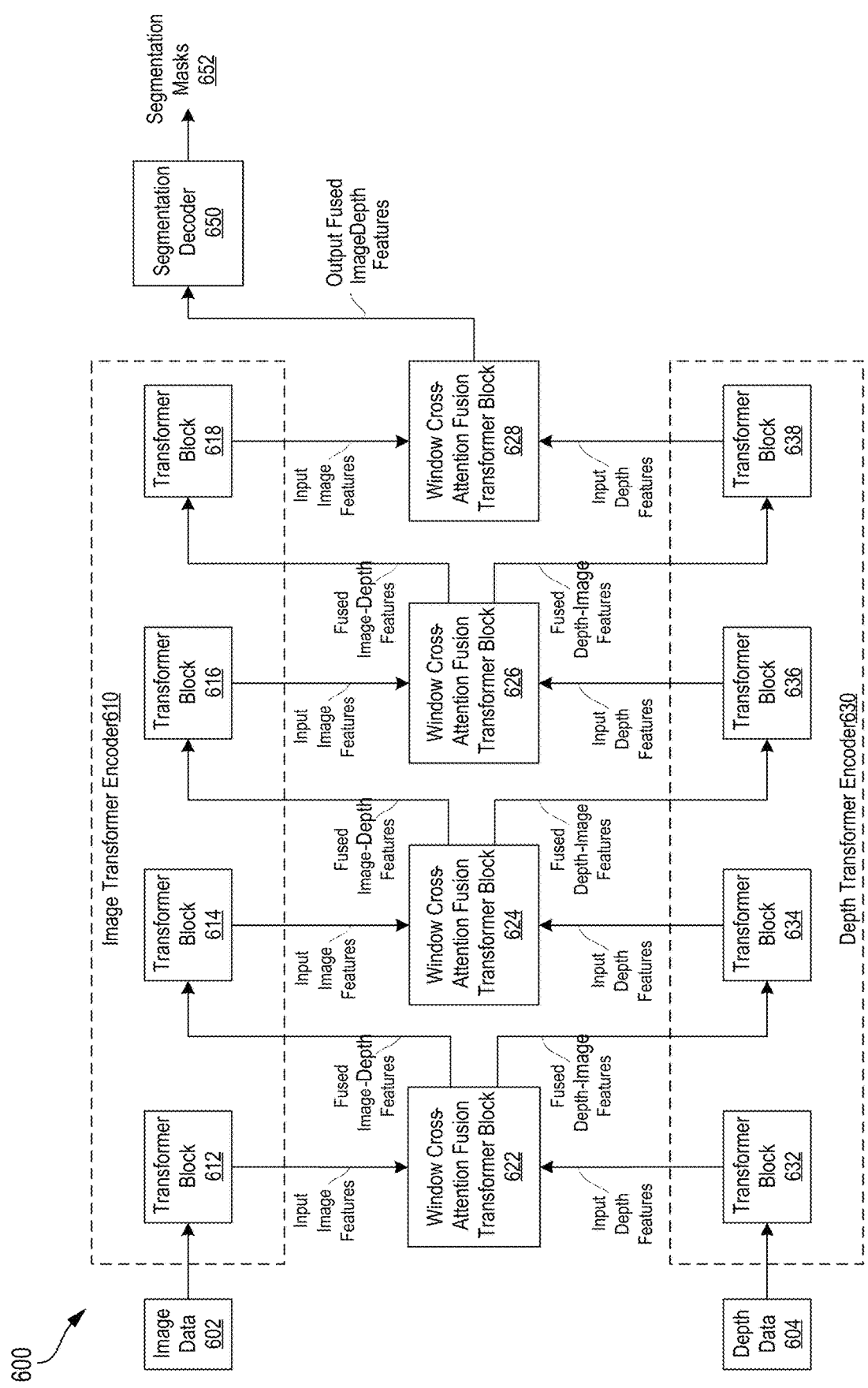
FIG. 6 is a diagram illustrating an example architecture of a transformer-based dual-encoding, cross-attention neural network system for multi-class image segmentation, in accordance with some examples of the present disclosure.

FIG. 6 is a diagram illustrating an example architecture 600 of a dual-encoding cross-attention network that can be used for multi-class semantic image segmentation, in accordance with some examples of the present disclosure. As illustrated, the example architecture 600 can correspond to a cross-attention transformer network that includes a transformer-based image encoder (e.g., image transformer encoder 610) and a transformer-based depth encoder (e.g., depth transformer encoder 630). In one illustrative example, the example architecture 600 depicted in FIG. 6 can be used to implement the dual-encoding cross-attention network 500 of FIG. 5. For example, image transformer encoder 610 can be the same as image encoder 510; depth transformer encoder 630 can be the same as depth encoder 530: window cross-attention fusion transformer blocks 622, 624, 626, and 628 can be the same as cross-attention fusion blocks 522, 524, 526, and 528, respectively: etc.

As illustrated in FIG. 6, image transformer encoder 610 includes at least a first transformer block 612, a second transformer block 614, a third transformer block 616, and a fourth transformer block 618. Depth transformer encoder 630 includes at least a first transformer block 632, a second transformer block 634, a third transformer block 636, and a fourth transformer block 638. It is noted that image transformer encoder 610 and/or depth transformer encoder 630) can include a greater or lesser number of transformer blocks without departing from the scope of the present disclosure. In some examples, the encoder transformer blocks 612-618 can have a same or similar architecture. Similarly, in some examples the depth encoder transformer blocks 632-638 can have a same or similar architecture. For example, the image encoder transformer blocks and the depth encoder transformer blocks can be provided as shifted window transformer blocks (e.g., as described previously with respect to FIGS. 3-4B).

As described above with respect to FIG. 5, a series of window cross-attention fusion transformer blocks 622, 624, 626, and 628 can be connected between the individual transformer blocks 612-618 and 632-638 of image transformer encoder 610 and depth transformer encoder 630, respectively. In some examples, the window cross-attention fusion transformer blocks 622, 624, and 626 can be bidirectional (e.g., with each one of the bidirectional cross-attention fusion transformer blocks generating fused image-depth features and fused depth-image features, as illustrated in FIG. 6). The window cross-attention fusion transformer block 628 can be unidirectional, generating output fused image-depth features that are received as input by a segmentation decoder 650. The segmentation decoder 650 can generate or otherwise determine one or more segmentation masks 652 for an input frame of image data 602, where the one or more segmentation masks 652 are based on the output fused image-depth features generated by unidirectional window cross-attention fusion transformer block 628.

In one illustrative example, one or more (or all) of the window cross-attention fusion transformer blocks 622, 624, 626, and 628 can be provided as shifted window transformer blocks, such as those described previously with respect to FIGS. 3-4B. As described herein, the shifted window transformer blocks can be used to compute cross-attention between image features and depth features (e.g., rather than computing self-attention as was described above with respect to FIGS. 3-4B). In some examples, self-attention is calculated over a single feature representation from a single source (e.g., hence the name "self" attention). Cross-attention, however, can be calculated over two different feature representations from two different sources (e.g., hence the name "cross" attention). For example, self-attention can be calculated for image features only or for depth features only: cross-attention can be calculated for a simultaneous combination of image features and depth features.

The following discussion describes an example processing flow in which the example dual-encoding cross-attention network architecture 600 of FIG. 6 can be used to perform semantic image segmentation for the input frame of image data 602. Reference is also made throughout to FIG. 7 and FIG. 8, which in some examples illustrate more detailed views of architectures and/or sub-networks for providing the window cross-attention fusion transformer blocks 622, 624, 626, and 628 of FIG. 6. For example, FIG. 7 illustrates an example architecture that can be used by one or more of the window cross-attention fusion transformer blocks 622, 624, 626, and 628: FIG. 8 illustrates an example of a window cross-attention transformer sub-network that can be included in the cross-attention fusion architecture of FIG. 7.

Returning to FIG. 6, as illustrated, a frame of image data 602 is provided as input to the first image transformer block 612 of image transformer encoder 610. The first image transformer block 612 can use the frame of image data 602 to generate or extract an initial set of image features. The initial set of image features can then be provided as an input to the first bidirectional cross-attention fusion transformer block 622 (e.g., indicated in FIG. 6 as 'Input Image Features').

Similarly, a frame of depth data 604 is provided as input to the first depth transformer block 632 of depth encoder 630. In some examples, the frame of depth data 604 comprises a plurality of depth values corresponding to a plurality of pixels included in the frame of image data 602. The first depth transformer block 632 can use the frame of depth data 604 to generate or extract an initial set of depth features. The initial set of depth features can then be provided as an additional input to the first bidirectional cross-attention fusion transformer block 622 (e.g., in addition to the initial set of image features generated by first image transformer block 612). The initial set of depth features is indicated in FIG. 6 as 'Input Depth Features'.

After receiving input image features from the first image transformer block 612 and input depth features from the first depth transformer block 632, the first bidirectional cross-attention fusion transformer block 622 can perform cross-attention fusion to generate as output fused image-depth features and fused depth-image features, as will be explained in greater depth below. As illustrated, the fused image-depth features can be provided as input to a second image transformer block 614, which then generates an intermediate set of image features that are provided as input to a second bidirectional cross-attention fusion transformer block 624. Similarly, the fused depth-image features can be provided as an input to a second depth transformer block 634, which then generates an intermediate set of depth features that are provided as an additional input to the second bidirectional cross-attention fusion transformer block 624.

The process above can be repeated for the third image transformer block 616, third depth transformer block 636, and the third bidirectional cross-attention fusion transformer block 626. In some examples, the dual-encoding cross-attention network architecture 600 can include more than the three bidirectional cross-attention fusion transformer blocks 622, 624, and 626, in which case the process above can be repeated in sequence for each bidirectional cross-attention fusion transformer block that is utilized.

The discussion turns next to FIG. 7, which depicts an example cross-attention fusion architecture 700 that can be used to fuse features of a source 702 to features of a target 704. For example, using architecture 700, depth features can be fused to image features by providing the depth features as the source 702 and the image features as the target 704; likewise, architecture 700 can be used to fuse image features to depth features by providing the image features as the source 702 and the depth features as the target 704.

In one illustrative example, each of the bidirectional cross-attention fusion transformer blocks 622, 624, and 626 can include an image fusion branch that implements architecture 700 to calculate cross-attention using the input image features as the cross-attention target 704 and the input depth features as the cross-attention source 702 (e.g., here, the image features are the cross-attention target because the image fusion branch fuses depth features to the image features). Each of the bidirectional cross-attention fusion transformer blocks 622, 624, and 626 can additionally include a depth fusion branch that also implements architecture 700, but with the input depth features used as target 704 and the input image features used as source 702 (e.g., here, the depth features are the cross-attention target because the depth fusion branch fuses image features to the depth features). In some examples, the unidirectional cross-attention fusion transformer block 628 can include only an image fusion branch.

Block 720 calculates a windowed cross-attention between the features of the source 702 (also referred to as source features 702) and the features of the target 704 (also referred to as target features 704), details of which are described below with respect to FIG. 8. In one illustrative example, the window cross-attention block 720 generates two cross-attention outputs. A first cross-attention output is the cross-attention determined for source features 702, and the source cross-attention is subsequently provided to a global average pooling block 734 that is configured to perform a global average pooling function. A second cross-attention output is the cross-attention determined for target features 704, and the target cross-attention is subsequently provided to a global average pooling block 732 that is configured to perform a global average pooling function.

In some examples, the source features 702 and the target features 704 (e.g., provided as either input image features generated by a transformer layer of image transformer encoder 610 or as input depth features generated by a transformer layer of depth encoder 630) can have a dimension of W×H×C, where W is a feature width, H is a feature height, and C is a feature spatial dimension. The source cross-attention output and the target cross-attention output generated by window cross attention block 720 can have the same dimension of W×H×C as the input source features 702 and the input target features 704.

Global average pooling block 732 can perform global average pooling for the source cross-attention output by collapsing the three-dimensional W×H×C source cross-attention output into a one-dimensional vector of dimension C (e.g., the resulting source vector contains C values). The resulting source vector values can be obtained by averaging the W×H features for each spatial dimension C of the source cross-attention output. Similarly, global average pooling block 734 can collapse the three-dimensional W×H×C target cross-attention output into a one-dimensional vector of dimension C by averaging the W×H features of each spatial dimension C of the target cross-attention output.

The outputs of global average pooling blocks 732 and 734 can then be used as channel-wise multipliers to the source features 702 and the target features 704, respectively. For example, channel-wise multiplier 742 can generate a modified source feature by performing channel-wise multiplication between the W×H×C source feature 702 and the resultant source vector of dimension C output by global average pooling block 732 (e.g., the resultant source vector described above). Channel-wise multiplier 744 can generate a modified target feature by performing channel-wise multiplication between the W×H×C target features 704 and the resultant target vector of dimension (output by global average pooling block 734 (e.g., the resultant target vector also described above).

A fusion layer 750 can generate a fused output feature 760 by adding the modified source feature generated by channel-wise multiplier 742 to the modified target feature generated by channel-wise multiplier 744. In some examples, the fused output feature 760 can have the same W×H×C dimensions as the source features 702 and the target features 704. Recalling that the source features 702 and the target features 704 can be provided as either input image features generated by a transformer layer of image transformer encoder 610 or as input depth features generated by a transformer layer of depth encoder 630, the fused output feature 760 can therefore have the same W×H×C dimensions as the image features and depth features generated by image transformer encoder 610 and depth encoder 630, respectively.

In one illustrative example, when cross-attention fusion architecture 700 is implemented in one or more of the window cross-attention fusion transformer blocks 622, 624, 626, and 628 of FIG. 6, the fused output features 760 of FIG. 7 can be the same as the fused image-depth features provided to a transformer block (614, 616, 618) of image transformer encoder 610 and/or can be the same as the fused depth-image features provided to a transformer block (634, 636, 638) of depth encoder 630.

For example, as described above, the first window cross-attention fusion transformer block 622 receives input image features from the first image transformer block 612 and input depth features from the first depth transformer block 632. The input image features can be provided as target features 704 to an image fusion branch implementing cross-attention fusion architecture 700 and the input depth features can be provided as source features 702 to the image fusion branch. The fused output features 760 of the image fusion branch implementing architecture 700) can be the same as the Fused Image-Depth Features shown in FIG. 6 as being generated by the first window cross-attention fusion transformer block 622.

In some examples, the first window cross-attention fusion transformer block 622 can generate the Fused Depth-Image Features' using the same input image features from first image transformer block 612 and the same input depth features from first depth transformer block 632. For example, the first window cross-attention fusion transformer block 622 can provide the same input depth features as target features 704 to a depth fusion branch implementing cross-attention fusion architecture 700 and can provide the same input image features as source features 702 to the depth fusion branch. Using the same input image and depth features as the image fusion branch, but reversing their assignment as source features 702 and target features 704, the depth fusion branch implementing cross-attention architecture 700 can generate the 'Fused Depth-Image Features' as the fused output features 760.

In some examples, by integrating information from two different modalities (image data and depth data), the cross-attention fusion architecture 700) and/or the cross-attention fusion transformer blocks 622, 624, 626 and 628 can allow for non-local interactions of complimentary features of the image data 602 and the depth data 604. For example, by generating modified source features and modified target features via the channel-wise multipliers 742 and 744, respectively, the cross-attention fusion architecture 700 can adaptively modify received image and depth features in a non-local manner. Moreover, by non-locally modifying the image features based on the depth features and non-locally modifying the depth features based on the image features, the cross-attention fusion layers of the present disclosure can be provided with more accurate and comprehensive information that ultimately drives the generation of semantic segmentation masks with improved accuracy and efficiency.

As has been mentioned previously, FIG. 8 illustrates an example of a window cross-attention transformer sub-network 800. In some examples, the window cross-attention transformer sub-network 800 can be included in the cross-attention fusion architecture 700 of FIG. 7. In one illustrative example, the window cross-attention transformer sub-network 800 can be the same as the window cross-attention block 720 depicted in FIG. 7. The window cross-attention transformer sub-network 800 receives as input source features 802 and target features 804 both having a dimension of 1×W×H×C. In some examples, the input source features 802 and the input target features 804 can be the same as the source features 702 and target features 704, respectively, that are shown in FIG. 7 as being provided to window cross-attention block 720. In some examples, input source features 802 and input target features 804 can be the same as the input image features generated by an image transformer layer of image transformer encoder 610 and/or the input depth features generated by a depth transformer layer of depth encoder 630.

The window cross-attention transformer sub-network 800 can include one or more shifted window transformer layers, such as the shifted window transformers described with respect to FIGS. 3-4B. Recalling that shifted window transformers can partition input features into a plurality of windows, the input source features 802 can be partitioned into a number of equally sized windows nWin by a window partitioning block 810a and the input target features 804 can be partitioned into the same number of equally sized windows nWin by a window partitioning block 810b. In some examples, the window partitioning block 810a can be the same as the window partitioning block 810b. As illustrated in FIG. 8, nWin W/7×H/7 and each equally sized window has a size of 7px×7px, although it is noted that various other window sizes (and therefore, different nWin) can be utilized without departing from the scope of the present disclosure.

The window partitioning blocks 810a and 810b can output windowed source features 822 and windowed target features 824, respectively. For a window size of 7×7, the output of windowed source features 822 and the output of windowed target features 824 can both have a dimension given by nWin×7×7×C.

A windowed cross-attention source branch 880 can determine cross-attention for the windowed source features 822 with respect to the windowed target features 824. A windowed cross-attention target branch 890 can determine cross-attention for the windowed target features 824 with respect to the windowed source features 822. In one illustrative example, cross-attention source branch 880 and cross-attention target branch 890 can calculate cross-attention in a same or similar manner as the self-attention calculation described above with respect to the shifted window transformers of FIGS. 3-4B (e.g., cross-attention can be calculated within local windows of the windowed source features 822 and the windowed target features 824, and can subsequently be calculated within shifted windows corresponding to the same windowed source features 822 and windowed target features 824).

In one illustrative example, for each input X comprising a windowed source feature 822 or a windowed target feature 824, cross-attention can be determined using a Key (e.g., a matrix K generated as $K=W_k \cdot X$), a Query (e.g., a matrix Q generated as $Q=W_q \cdot X$), and a Value (e.g., a matrix V generated as $V=W_v \cdot X$).

When the inputs to K, Q, and V are the same X, self-attention can be calculated (e.g., when K. Q. and V are generated from the same set of input features). When the inputs to K, Q, and V are obtained from two different sets of input features, such as from image features and depth features, cross-attention can be calculated instead of self-attention. For example, as illustrated in FIG. 8, the cross-attention source branch 880 generates K and V from the windowed target features 824 and generates Q from the windowed source features 822. The cross-attention target branch 890 generates K and V from the windowed source features 822 and generates Q from the windowed target features 824.

As illustrated in FIG. 8, the matrices K, Q. and I can be generated by applying 1×1 convolutional layers $W_k$, $W_q$, and $W_v$, respectively, to the windowed source features 822 or the windowed target features 824 that are provided as the cross-attention inputs. In some cases, the $W_k$, $W_q$, and $W_v$ terms can be linear transform layers that project or map an input of windowed source features 822 or windowed target features 824 to key (K), query (Q), and value (V) matrices.

In one illustrative example, the 1×1 convolutional layers $W_k$, $W_q$, and $W_v$ can be trained separately for the cross-attention source branch 880 and the cross-attention target branch 890, such that the 1×1 convolutional layers of the cross-attention source branch 880 may contain different internal parameters than the 1×1 convolutional layers of the cross-attention target branch 890. In some examples, the 1×1 convolutional layers $W_k$, $W_q$, and $W_v$ can be trained simultaneously or in combination with the training of one or more of the window cross-attention fusion transformer blocks 622, 624, 626, and/or 628 (e.g., in which the 1×1 convolutional layers $W_k$, $W_q$, and $W_v$ of the source and target branches 880, 890 can be located).

The cross-attention source branch 880 can calculate cross-attention source features 832 based on generating the K and V matrices from the windowed target features 824 and generating the Q matrices from the windowed source features 822. The cross-attention target branch 890 can calculate cross-attention target features 834 based on generating the K and V matrices from the windowed source features 822 and generating the Q matrices from the windowed target features 824.

The cross-attention source features 832 and the cross-attention target features 834 can both be generated to include one or more windowed features having the same nWin×7×7×C dimensions as the windowed source features 822 and the windowed target features 824 that were provided as inputs to the cross-attention source branch 880 and/or the cross-attention target branch 890. The cross-attention source branch 880 can include a window partition reversing block

840*a* and the cross-attention target branch 890 can include a window partition reversing block 840*b*. In some examples, the window partition reversing blocks 840*a* and 840*b* can be the same.

Window partition reversing block 840*a* can merge or otherwise combine the nWin×7×7×C windowed cross-attention source features 832 into a single cross-attention source feature 842 having a dimension of 1×W×H×C (e.g., with nWin=1) that is the same as the dimension of the input source features 802. Window partition reversing block 840*b* can merge or otherwise combine the nWin×7×7×C windowed cross-attention target features 834 into a single cross-attention target feature 844 also having a dimension of 1×W×H×C (e.g., with nWin=1) that is the same as the dimension of the input target features 804.

In one illustrative example, the cross-attention source features 842 output by the cross-attention source branch 880 can be provided to the global average pooling block 732 illustrated in FIG. 7. Similarly, the cross-attention target features 844 output by the cross-attention target branch 890 can be provided to the global average pooling block 734 illustrated in FIG. 7.

Figure 9:
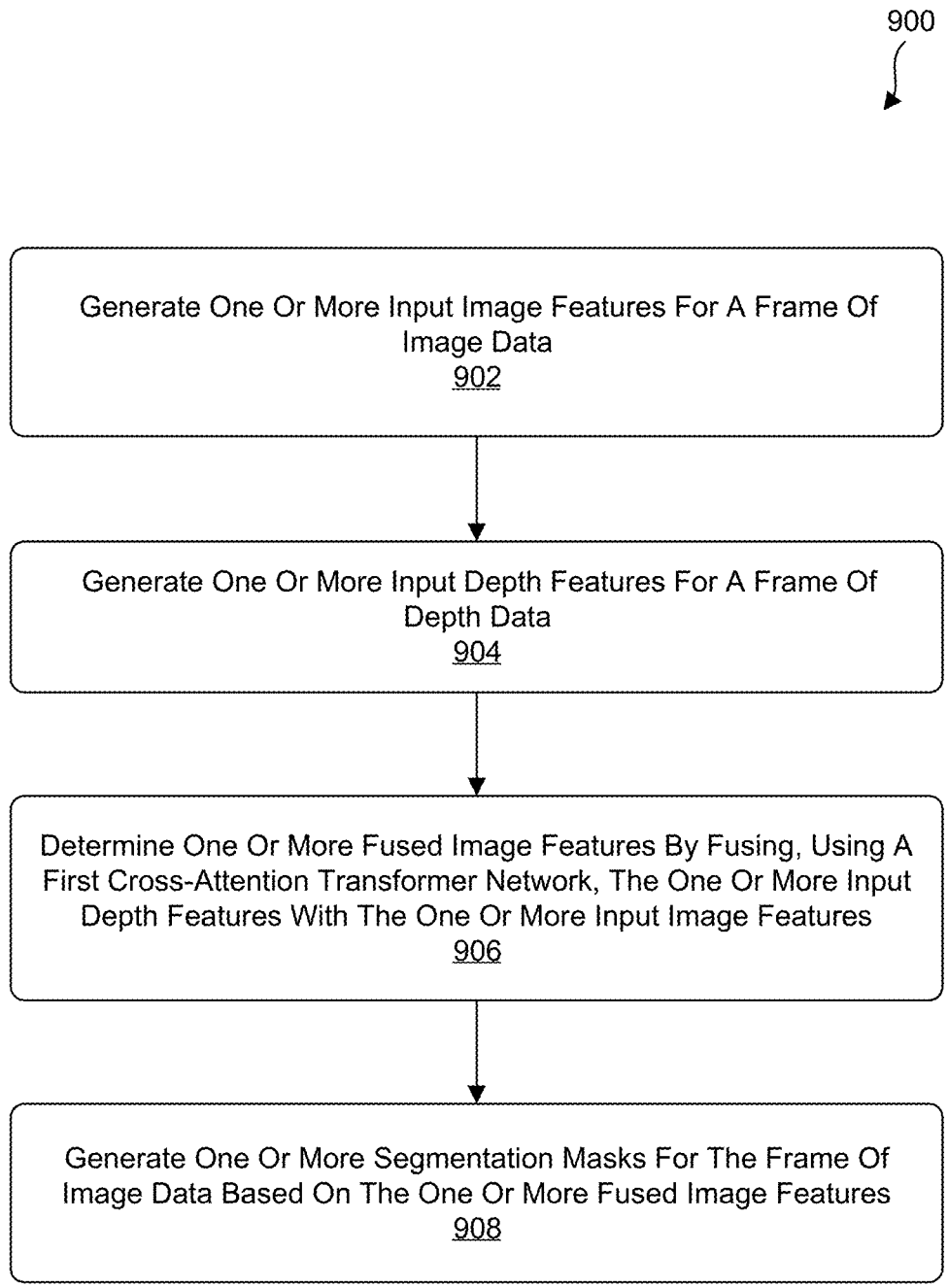
FIG. 9 is a flow diagram illustrating an example of a process for processing image and/or video data, in accordance with some examples of the present disclosure.

FIG. 9 is a flowchart illustrating an example of a process 900 for processing image and/or video data. Although the example process 900 depicts a particular sequence of operations, the sequence may be altered without departing from the scope of the present disclosure. For example, some of the operations depicted may be performed in parallel or in a different sequence that does not materially affect the function of the process 900. In other examples, different components of an example device or system that implements the process 900 may perform functions at substantially the same time or in a specific sequence.

At block 902, the process 900 includes generating one or more image features for a frame of image data. In some examples, the frame of image data includes color image data. For example, the frame of image data can include RGB image data, or color image data associated with other color models. In some cases, the frame of image data can be obtained from a still image and/or can be obtained from one or more frames of video data.

In some examples, an image encoder network can generate the one or more input image features based on the frame of image data. For example, the image encoder network can include the RGB transformer encoder 510 illustrated in FIG. 5 and/or the image transformer encoder 610 illustrated in FIG. 6. In some examples, the image encoder network can include one or more encoder transformer layers, and at least a first encoder transformer layer can be used to generate the one or more input image features based on the frame of image data. For example, the one or more encoder transformer layers can include one or more of the transformer blocks 612-618 illustrated in FIG. 6.

In some examples, the encoder transformer layer(s) of the image encoder network can generate the one or more input image features based at least in part on previously fused image features. In some cases, the previously fused image features used by the encoder transformer layer(s) of the image encoder network can be generated at least in part by a first-cross attention transformer network, as will be described in greater depth below with respect to block 906.

At block 904, the process 900 includes generating one or more input depth features for a frame of depth data. In some examples, the frame of depth data can be associated with the frame of image data (e.g., the frame of image data described above with respect to block 902). For example, the frame of depth data can include a depth map associated with the frame of image data. The frame of depth data can include a plurality of depth values for a plurality of pixels of the frame of image data. In some examples, the frame of depth data can include a depth value for each pixel of the plurality of pixels of the frame of image data.

In some examples, a depth encoder network can generate the one or more input depth features based on the frame of depth data. For example, the depth encoder network can include the depth transformer encoder 530 illustrated in FIG. 5 and/or the depth transformer encoder 630 illustrated in FIG. 6. In some examples, the depth encoder network can include one or more encoder transformer layers, and at least a first encoder transformer layer can be used to generate the one or more input depth features based on the frame of depth data. For example, the one or more encoder transformer layers can include one or more of the transformer blocks 632-638 illustrated in FIG. 6.

In some examples, the encoder transformer layer(s) of the depth encoder network can generate the one or more input depth features based at least in part on previously fused depth features. In some cases, the previously fused depth features used by the encoder transformer layer(s) of the depth encoder network can be generated at least in part by a first cross-attention transformer network, which can be the same as the first cross-attention transformer network used to generate the previously fused image features described above with respect to block 902.

At block 906, the process 900 includes determining one or more fused image features at least in part by fusing, using a first cross-attention transformer network, the one or more input depth features with the one or more input image features. In some examples, the first cross-attention transformer network can include one or more shifted window transformer layers for calculating cross-attention. For example, the first cross-attention transformer network can include one or more of the window cross-attention fusion transformer blocks 622-628 illustrated in FIG. 6, the window cross-attention block 720 illustrated in FIG. 7, and/or the window cross-attention transformer sub-network 800 illustrated in FIG. 8.

In some examples, the first cross-attention transformer network can be a bidirectional cross-attention transformer network. For example, a first cross-attention transformer branch of the first cross-attention transformer network can generate fused image features by fusing the input depth features with the input image features. In some aspects, the first cross-attention transformer branch can calculate the fused image features based on calculating a first cross-attention using the input image features as a target and the input depth features as a source. For example, the first cross-attention transformer branch can include the window cross-attention for target features block 890 illustrated in FIG. 8.

A second cross-attention transformer branch of the first cross-attention transformer network can generate fused depth features by fusing the input image features with the input depth features. In some aspects, the second cross-attention transformer branch can calculate the fused depth features based on calculating a second cross-attention using the input image features as a source and the input depth features as a target. For example, the second cross-attention transformer branch can include the window cross-attention for target features block 890 illustrated in FIG. 8. In some examples, the second cross-attention transformer branch can calculate the fused depth features based on calculating a second cross-attention using the input image features as a target and the input depth features as a source. In this example, the second cross-attention transformer branch can include the window cross-attention for source features block 880 illustrated in FIG. 8.

In some examples, the first cross-attention transformer branch and the second cross-attention transformer branch (e.g., of the first cross-attention transformer network) can use the same input image features and/or the same input depth features. For example, one or more (or all) of the window cross-attention fusion transformer blocks 622-626 illustrated in FIG. 6 can each include a first cross-attention transformer branch and a second cross-attention transformer branch, wherein the first and second cross-attention transformer branches each use the same input image features (e.g., received from the same one of the transformer blocks 612-616 illustrated in FIG. 6) and/or the same input depth features (e.g., received from the same one of the transformer blocks 632-636 illustrated in FIG. 6).

In some examples, the process 900 can further include using a second cross-attention transformer network to fuse the one or more fused depth features with the one or more fused image features, based on calculating a unidirectional cross-attention using the fused image features as a target and the fused depth features as a source. In some aspects, the second cross-attention transformer network can be a unidirectional cross-attention transformer network. For example, the second cross-attention transformer network can be used to perform the one-way cross-attention fusion operation 528 illustrated in FIG. 5. In some examples, the second cross-attention transformer network can include the window cross-attention fusion transformer block 628 illustrated in FIG. 6. In some cases, the second cross-attention transformer network can include one of the two window cross-attention networks 880 or 890 illustrated in FIG. 8.

At block 908, the process 900 includes generating one or more segmentation masks for the frame of image data based on the one or more fused image features. For example, the segmentation decoder 550) illustrated in FIG. 5 can be used to generate the one or more segmentations masks 552 also illustrated in FIG. 5. In some examples, the one or more segmentation masks for the frame of image data can be generated by the segmentation decoder 650 illustrated in FIG. 6 (e.g., the segmentation masks 652 can be generated for the frame of image data 602, using the segmentation decoder 650)).

In some examples, the one or more segmentation masks for the frame of image data can be generated based on an output of a unidirectional cross-attention transformer network that fuses the one or more fused depth features into the one or more fused image features. For example, the one or more segmentation masks for the frame of image data can be generated based on the unidirectional cross-attention fusion output 528 illustrated in FIG. 5 and/or the output of the window cross-attention fusion transformer block 628 illustrated in FIG. 6.

In some examples, the processes described herein (e.g., process 900 and/or any other process described herein) may be performed by a computing device, apparatus, or system. In one example, the process 900 can be performed by a computing device or system having the computing device architecture 1000 of FIG. 10. The computing device, apparatus, or system can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 900 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 900 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
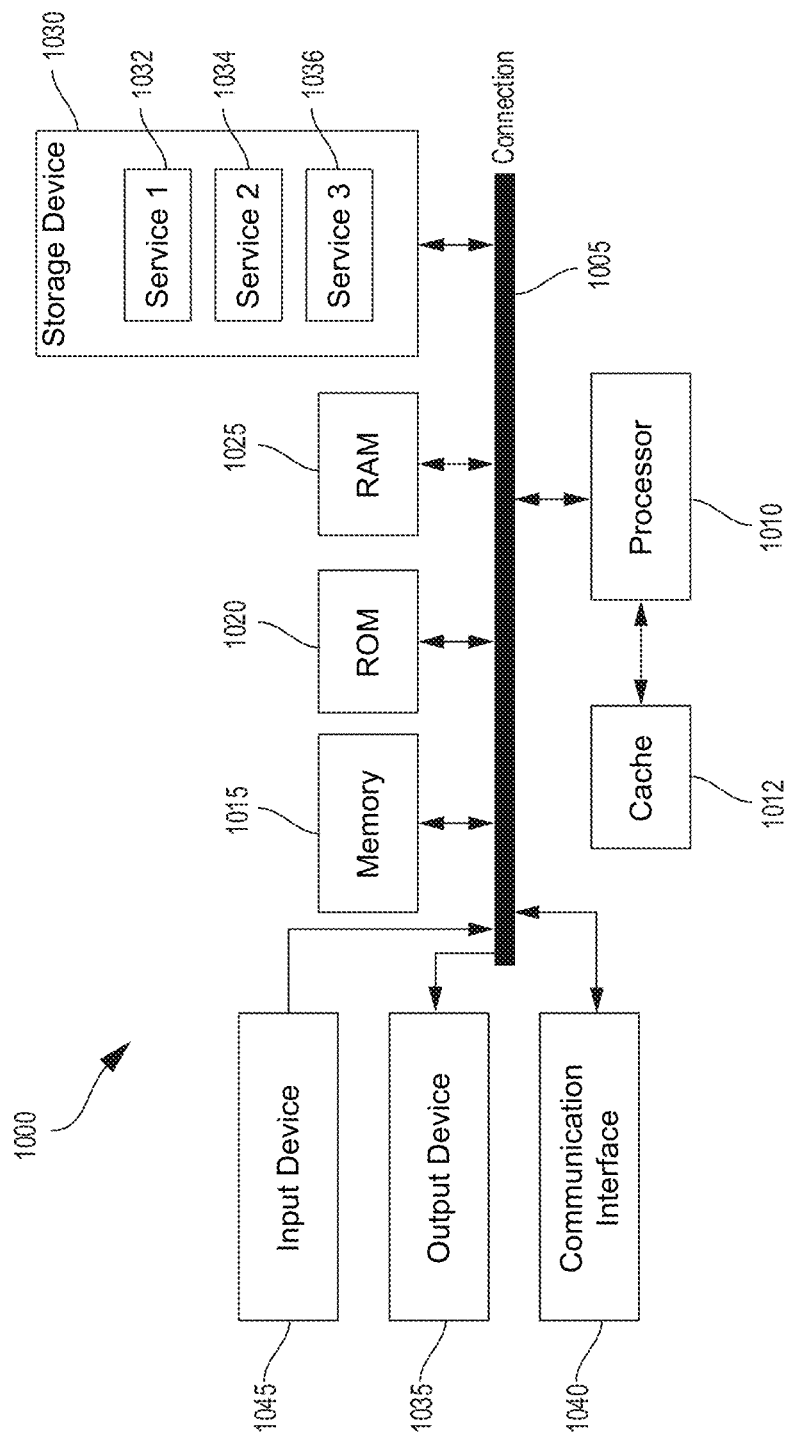
FIG. 10 is a block diagram illustrating an example of a computing system for implementing certain aspects described herein.

FIG. 10 illustrates an example computing device architecture 1000 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing device architecture 1000 can implement the system of FIG. 6. The components of computing device architecture 1000 are shown in electrical communication with each other using connection 1005, such as a bus. The example computing device architecture 1000 includes a processing unit (CPU or processor) 1010 and computing device connection 1005 that couples various computing device components including computing device memory 1015, such as read only memory (ROM) 1020 and random-access memory (RAM) 1025, to processor 1010.

Computing device architecture 1000 can include a cache of high-speed memory connected directly with, in close proximity to, or integrated as part of processor 1010. Computing device architecture 1000 can copy data from memory 1015 and/or the storage device 1030 to cache 1012 for quick access by processor 1010. In this way, the cache can provide a performance boost that avoids processor 1010 delays while waiting for data. These and other engines can control or be configured to control processor 1010 to perform various actions. Other computing device memory 1015 may be available for use as well. Memory 1015 can include multiple different types of memory with different performance characteristics. Processor 1010 can include any general-purpose processor and a hardware or software service, such as service 1 1032, service 2 1034, and service 3 1036 stored in storage device 1030, configured to control processor 1010 as well as a special-purpose processor where software instructions are incorporated into the processor design. Processor 1010 may be a self-contained system, containing multiple cores or processors, a bus, memory controller, cache, etc. A multi-core processor may be symmetric or asymmetric.

To enable user interaction with the computing device architecture 1000, input device 1045 can represent any number of input mechanisms, such as a microphone for speech, a touch-sensitive screen for gesture or graphical input, keyboard, mouse, motion input, speech and so forth. Output device 1035 can also be one or more of a number of output mechanisms known to those of skill in the art, such as a display, projector, television, speaker device, etc. In some instances, multimodal computing devices can enable a user to provide multiple types of input to communicate with computing device architecture 1000. Communication interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof. Storage device 1030 can include services 1032, 1034, 1036 for controlling processor 1010. Other hardware or software modules or engines are contemplated. Storage device 1030 can be connected to the computing device connection 1005. In one aspect, a hardware module that performs a particular function can include the software component stored in a computer-readable medium in connection with the necessary hardware components, such as processor 1010, connection 1005, output device 1035, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic array's (FPGAs), or other equivalent integrated or discrete logic circuitry. Such a processor may be configured to perform any of the techniques described in this disclosure. A general-purpose processor may be a microprocessor: but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: An apparatus for processing image data, comprising: at least one memory; and at least one processor coupled to the at least one memory, the at least one processor configured to: generate one or more input image features for a frame of image data: generate one or more input depth features for a frame of depth data: determine one or more fused image features at least in part by fusing, using a first cross-attention transformer network, the one or more input depth features with the one or more input image features; and generate one or more segmentation masks for the frame of image data based on the one or more fused image features.

Aspect 2: The apparatus of Aspect 1, wherein, to determine the one or more fused image features, the at least one processor is configured to fuse the one or more input depth features with the one or more input image features using a first cross-attention transformer branch of the first cross-attention transformer network.

Aspect 3: The apparatus of Aspect 2, wherein the at least one processor is further configured to: determine one or more fused depth features at least in part by fusing the one or more input image features with the one or more input depth features using a second cross-attention transformer branch of the first cross-attention transformer network.

Aspect 4: The apparatus of Aspect 3, wherein: the first cross-attention transformer branch is configured to determine the one or more fused image features based on calculating a first cross-attention using the one or more input image features as a target and the one or more input depth features as a source; and the second cross-attention transformer branch is configured to determine the one or more fused depth features based on calculating a second cross-attention using the one or more input depth features as a target and the one or more input image features as a source.

Aspect 5: The apparatus of any of Aspects 3 to 4, wherein the at least one processor is further configured to: fuse, using a second cross-attention transformer network, the one or more fused depth features with the one or more fused image features, based on calculating a unidirectional cross-attention using the one or more fused image features as a target and the one or more fused depth features as a source.

Aspect 6: The apparatus of Aspect 5, wherein: the first cross-attention transformer network is a bidirectional cross-attention transformer network; and the second cross-attention transformer network is a unidirectional cross-attention transformer network.

Aspect 7: The apparatus of any of Aspects 5 to 6, wherein the at least one processor is further configured to: generate the one or more segmentation masks for the frame of image data based on an output of the second cross-attention transformer network, wherein the output of the second cross-attention transformer network includes the one or more fused depth features fused with the one or more fused image features.

Aspect 8: The apparatus of any of Aspects 3 to 7, wherein: the one or more input image features used by the first cross-attention transformer branch are the same as the one or more input image features used by the second cross-attention transformer branch; and the one or more input depth features used by the first cross-attention transformer branch are the same as the one or more input depth features used by the second cross-attention transformer branch.

Aspect 9: The apparatus of any of Aspects 1 to 8, wherein the first cross-attention transformer network: receives the one or more input image features from an encoder transformer layer of an image encoder network; and receives the one or more input depth features from an encoder transformer layer of a depth encoder network.

Aspect 10: The apparatus of Aspect 9, wherein: the encoder transformer layer of the image encoder network generates the one or more input image features based on the frame of image data; and the encoder transformer layer of the depth encoder network generates the one or more input depth features based on the frame of depth data.

Aspect 11: The apparatus of any of Aspects 9 to 10, wherein: the encoder transformer layer of the image encoder network generates the one or more input image features based on previously fused image features; and the encoder transformer layer of the depth encoder network generates the one or more input depth features based on previously fused depth features.

Aspect 12: The apparatus of Aspect 11, wherein one or more of the previously fused image features and the previously fused depth features are generated at least in part by the first cross-attention transformer network.

Aspect 13: The apparatus of any of Aspects 1 to 12, wherein the frame of depth data includes a plurality of depth values for a plurality of pixels of the frame of image data.

Aspect 14: The apparatus of any of Aspects 1 to 13, wherein: the frame of image data includes color image data; and the frame of depth data includes a depth map associated with the frame of image data.

Aspect 15: The apparatus of any of Aspects 1 to 14, wherein the first cross-attention transformer network includes one or more shifted window transformer layers.

Aspect 16: A method for processing image data, the method comprising: generating one or more input image features for a frame of image data: generating one or more input depth features for a frame of depth data: determining one or more fused image features at least in part by fusing, using a first cross-attention transformer network, the one or more input depth features with the one or more input image features; and generating one or more segmentation masks for the frame of image data based on the one or more fused image features.

Aspect 17: The method of Aspect 16, wherein determining the one or more fused image features comprises: fusing the one or more input depth features with the one or more input image features using a first cross-attention transformer branch of the first cross-attention transformer network.

Aspect 18: The method of Aspect 17, further comprising: determining one or more fused depth features at least in part by fusing the one or more input image features with the one or more input depth features using a second cross-attention transformer branch of the first cross-attention transformer network.

Aspect 19: The method of Aspect 18, wherein: the first cross-attention transformer branch is configured to determine the one or more fused image features based on calculating a first cross-attention using the one or more input image features as a target and the one or more input depth features as a source; and the second cross-attention transformer branch is configured to determine the one or more fused depth features based on calculating a second cross-attention using the one or more input depth features as a target and the one or more input image features as a source.

Aspect 20: The method of any of Aspects 18 to 19, further comprising: fusing, using a second cross-attention transformer network, the one or more fused depth features with the one or more fused image features, based on calculating a unidirectional cross-attention using the one or more fused image features as a target and the one or more fused depth features as a source.

Aspect 21: The method of Aspect 20, wherein: the first cross-attention transformer network is a bidirectional cross-attention transformer network; and the second cross-attention transformer network is a unidirectional cross-attention transformer network.

Aspect 22: The method of any of Aspects 20 to 21, further comprising: generating the one or more segmentation masks for the frame of image data based on an output of the second cross-attention transformer network, wherein the output of the second cross-attention transformer network includes the one or more fused depth features fused with the one or more fused image features.

Aspect 23: The method of any of Aspects 18 to 22, wherein: the one or more input image features used by the first cross-attention transformer branch are the same as the one or more input image features used by the second cross-attention transformer branch; and the one or more input depth features used by the first cross-attention transformer branch are the same as the one or more input depth features used by the second cross-attention transformer branch.

Aspect 24: The method of any of Aspects 16 to 23, wherein the first cross-attention transformer network: receives the one or more input image features from an encoder transformer layer of an image encoder network; and receives the one or more input depth features from an encoder transformer layer of a depth encoder network.

Aspect 25: The method of Aspect 24, wherein: the encoder transformer layer of the image encoder network generates the one or more input image features based on the frame of image data; and the encoder transformer layer of the depth encoder network generates the one or more input depth features based on the frame of depth data.

Aspect 26: The method of any of Aspects 24 to 25, wherein: the encoder transformer layer of the image encoder network generates the one or more input image features based on previously fused image features; and the encoder transformer layer of the depth encoder network generates the one or more input depth features based on previously fused depth features.

Aspect 27: The method of Aspect 26, wherein one or more of the previously fused image features and the previously fused depth features are generated at least in part by the first cross-attention transformer network.

Aspect 28: The method of any of Aspects 16 to 27, wherein the frame of depth data includes a plurality of depth values for a plurality of pixels of the frame of image data.

Aspect 29: The method of any of Aspects 16 to 28, wherein: the frame of image data includes color image data; and the frame of depth data includes a depth map associated with the frame of image data.

Aspect 30: The method of any of Aspects 16 to 29, wherein the first cross-attention transformer network includes one or more shifted window transformer layers.

Aspect 31: A non-transitory computer-readable storage medium having stored thereon instructions which, when executed by one or more processors, cause the one or more processors to perform any of the operations of Aspects 1 to 30.

Aspect 32: An apparatus comprising means for performing any of the operations of Aspects 1 to 30.

What is claimed is:

1. An apparatus for processing image data, comprising:
at least one memory; and
at least one processor coupled to the at least one memory, the at least one processor configured to:
generate, using an encoder transformer layer of an image encoder network, input image features for a frame of image data;
generate, using an encoder transformer layer of a depth encoder network, input depth features for a frame of depth data;
generate, using a first cross-attention transformer network configured to calculate cross-attention between the image encoder network and the depth encoder network, one or more cross-attention features based on using the input image features as a cross-attention target and the input depth features as a cross-attention source;
determine one or more fused image features at least in part by using the one or more cross-attention features to fuse the input depth features with the input image features; and
generate one or more segmentation masks for the frame of image data based on the one or more fused image features.

2. The apparatus of claim 1, wherein, to determine the one or more fused image features, the at least one processor is configured to fuse the input depth features with the input image features based on the one or more cross-attention features and using a first cross-attention transformer branch of the first cross-attention transformer network.

3. The apparatus of claim 2, wherein the at least one processor is further configured to:
determine one or more fused depth features at least in part by fusing the input image features with the input depth features using a second cross-attention transformer branch of the first cross-attention transformer network.

4. The apparatus of claim 3, wherein:
the first cross-attention transformer branch is configured to determine the one or more fused image features based on calculating a first cross-attention using the input image features as a target and the input depth features as a source; and
the second cross-attention transformer branch is configured to determine the one or more fused depth features based on calculating a second cross-attention using the input depth features as a target and the input image features as a source.

5. The apparatus of claim 3, wherein the at least one processor is further configured to:
fuse, using a second cross-attention transformer network, the one or more fused depth features with the one or more fused image features, based on calculating a unidirectional cross-attention using the one or more fused image features as a target and the one or more fused depth features as a source.

6. The apparatus of claim 5, wherein:
the first cross-attention transformer network is a bidirectional cross-attention transformer network; and
the second cross-attention transformer network is a unidirectional cross-attention transformer network.

7. The apparatus of claim 5, wherein the at least one processor is further configured to:
generate the one or more segmentation masks for the frame of image data based on an output of the second cross-attention transformer network, wherein the output of the second cross-attention transformer network includes the one or more fused depth features fused with the one or more fused image features.

8. The apparatus of claim 3, wherein:
the input image features used by the first cross-attention transformer branch are the same as the input image features used by the second cross-attention transformer branch; and
the input depth features used by the first cross-attention transformer branch are the same as the input depth features used by the second cross-attention transformer branch.

9. The apparatus of claim 1, wherein the first cross-attention transformer network:
receives the input image features from a transformer-based encoder of the image encoder network; and
receives the input depth features from a transformer-based encoder of the depth encoder network.

10. The apparatus of claim 9, wherein:
the encoder transformer layer is included in the transformer-based encoder and is configured to generate the input image features based on the frame of image data; and
the encoder transformer layer is included in the transformer-based encoder and is configured to generate the input depth features based on the frame of depth data.

11. The apparatus of claim 9, wherein:
the encoder transformer layer of the image encoder network generates the input image features based on previously fused image features; and
the encoder transformer layer of the depth encoder network generates the input depth features based on previously fused depth features.

12. The apparatus of claim 11, wherein one or more of the previously fused image features and the previously fused depth features are generated at least in part by the first cross-attention transformer network.

13. The apparatus of claim 1, wherein the frame of depth data includes a plurality of depth values for a plurality of pixels of the frame of image data.

14. The apparatus of claim 1, wherein:
the frame of image data includes color image data; and
the frame of depth data includes a depth map associated with the frame of image data.

15. The apparatus of claim 1, wherein the first cross-attention transformer network includes one or more shifted window transformer layers.

16. A method for processing image data, the method comprising:
generating, using an encoder transformer layer of an image encoder network, input image features for a frame of image data;
generating, using an encoder transformer layer of a depth encoder network, input depth features for a frame of depth data;
generating, using a first cross-attention transformer network configured to calculate cross-attention between the image encoder network and the depth encoder network, one or more cross-attention features based on using the input image features as a cross-attention target and the input depth features as a cross-attention source;
determining one or more fused image features at least in part by using the one or more cross-attention features to fuse the input depth features with the input image features; and
generating one or more segmentation masks for the frame of image data based on the one or more fused image features.

17. The method of claim 16, wherein determining the one or more fused image features comprises:
fusing the input depth features with the input image features based on the one or more cross-attention features and using a first cross-attention transformer branch of the first cross-attention transformer network.

18. The method of claim 17, further comprising:
determining one or more fused depth features at least in part by fusing the input image features with the input depth features using a second cross-attention transformer branch of the first cross-attention transformer network.

19. The method of claim 18, wherein:
the first cross-attention transformer branch is configured to determine the one or more fused image features based on calculating a first cross-attention using the input image features as a target and the input depth features as a source; and
the second cross-attention transformer branch is configured to determine the one or more fused depth features based on calculating a second cross-attention using the input depth features as a target and the input image features as a source.

20. The method of claim 18, further comprising:
fusing, using a second cross-attention transformer network, the one or more fused depth features with the one or more fused image features, based on calculating a unidirectional cross-attention using the one or more fused image features as a target and the one or more fused depth features as a source.

21. The method of claim 20, wherein:
the first cross-attention transformer network is a bidirectional cross-attention transformer network; and
the second cross-attention transformer network is a unidirectional cross-attention transformer network.

22. The method of claim 20, further comprising:
generating the one or more segmentation masks for the frame of image data based on an output of the second cross-attention transformer network, wherein the output of the second cross-attention transformer network includes the one or more fused depth features fused with the one or more fused image features.

23. The method of claim 18, wherein:
the input image features used by the first cross-attention transformer branch are the same as the input image features used by the second cross-attention transformer branch; and
the input depth features used by the first cross-attention transformer branch are the same as the input depth features used by the second cross-attention transformer branch.

24. The method of claim 16, wherein the first cross-attention transformer network:
receives the input image features from a transformer-based encoder of the image encoder network; and
receives the input depth features from a transformer-based encoder of the depth encoder network.

25. The method of claim 24, wherein:
the encoder transformer layer is included in the transformer-based encoder and is configured to generate the input image features based on the frame of image data; and
the encoder transformer layer is included in the transformer-based encoder and is configured to generate the input depth features based on the frame of depth data.

26. The method of claim 24, wherein:
the encoder transformer layer of the image encoder network generates the input image features based on previously fused image features; and
the encoder transformer layer of the depth encoder network generates the input depth features based on previously fused depth features.

27. The method of claim 26, wherein one or more of the previously fused image features and the previously fused depth features are generated at least in part by the first cross-attention transformer network.

28. The method of claim 16, wherein the frame of depth data includes a plurality of depth values for a plurality of pixels of the frame of image data.

29. The method of claim 16, wherein:
the frame of image data includes color image data; and
the frame of depth data includes a depth map associated with the frame of image data.

30. The method of claim 16, wherein the first cross-attention transformer network includes one or more shifted window transformer layers.

* * * * *